(12) United States Patent
Vishal

(10) Patent No.: US 10,558,653 B2
(45) Date of Patent: Feb. 11, 2020

(54) DYNAMIC, VARIABLE-DATA ATTRIBUTE DATA SERVICE

(71) Applicant: SAP SE, Walldorf (DE)

(72) Inventor: Vivek Vishal, Bangalore (IN)

(73) Assignee: SAP SE, Walldorf (DE)

( * ) Notice: Subject to any disclaimer, the term of this patent is extended or adjusted under 35 U.S.C. 154(b) by 231 days.

(21) Appl. No.: 15/616,119

(22) Filed: Jun. 7, 2017

(65) Prior Publication Data

US 2018/0357274 A1    Dec. 13, 2018

(51) Int. Cl.
    *G06F 16/242*     (2019.01)
    *G06F 16/14*      (2019.01)
    *G06F 16/907*     (2019.01)
    *G06F 16/2453*    (2019.01)

(52) U.S. Cl.
    CPC ........ *G06F 16/2448* (2019.01); *G06F 16/148* (2019.01); *G06F 16/242* (2019.01); *G06F 16/24534* (2019.01); *G06F 16/907* (2019.01)

(58) Field of Classification Search
    CPC ..... G06F 8/30; G06F 8/33; G06F 8/70; G06F 8/71; G06F 8/76; G06F 16/2448; G06F 16/907; G06F 16/24534; G06F 16/148; G06F 16/242
    USPC ........................................................ 707/769
    See application file for complete search history.

(56) References Cited

U.S. PATENT DOCUMENTS

| | | | | |
|---|---|---|---|---|
| 6,112,199 A * | 8/2000 | Nelson | ................. | G06F 16/2291 |
| 8,813,026 B1 * | 8/2014 | Vobugari | ................ | G06F 17/00 715/200 |
| 2003/0236577 A1 * | 12/2003 | Clinton | ..................... | G06F 8/51 700/10 |
| 2005/0091276 A1 * | 4/2005 | Brunswig | ......... | G06F 16/90335 |
| 2005/0234931 A1 * | 10/2005 | Yip | ..................... | H04L 41/0816 |
| 2007/0174308 A1 * | 7/2007 | Rausch | ................. | G06F 16/283 |
| 2012/0290620 A1 * | 11/2012 | Guan | .................... | G06F 16/252 707/779 |

(Continued)

OTHER PUBLICATIONS

"A Refreshed OData Client Code Generator," retrieved from https://visualstudiomagazine.com/articles/2014/07/24/odata-client-code-2.aspx, on or before Jun. 2017, 2 pages.

(Continued)

*Primary Examiner* — Cam Y T Truong
(74) *Attorney, Agent, or Firm* — Klarquist Sparkman, LLP

(57) ABSTRACT

A dynamic data service accepts requests for database operations from a client application, where the requests can be associated with a property, including a particular data member, of a data model template. The property has at least one attribute that can be instantiated in a plurality of configuration values. The property is instantiated with the at least one attribute having a configuration value that is appropriate for fulfilling a client request, including being instantiated a plurality of times with a plurality of configuration values. The dynamic data service can send the request to a database for execution and return execution results to the client application. The dynamic data service can allow for the more flexible design of client applications, as the client applications can use different configuration values, or can use combinations of configuration values. The dynamic data service can provide improved performance, as multiple configuration values can be use with a single data service and a single data model template.

20 Claims, 13 Drawing Sheets

(56) References Cited

U.S. PATENT DOCUMENTS

2014/0279808 A1* 9/2014 Strassner ............... G06Q 10/06
706/47
2014/0351577 A1 11/2014 Vishal
2016/0191502 A1 6/2016 Vishal

OTHER PUBLICATIONS

"Atom (standard)," retrieved from https://en.wikipedia.org/wiki/Atom_(standard), on or before Jun. 2017, 3 pages.
"Basic Tutorial," retrieved from http://www.odata.org/getting-started/basic-tutorial/#entityByID, on or before Jun. 2017, 30 pages.
"Business Application Programming Interface," retrieved from https://en.wikipedia.org/wiki/Business_Application_Programming_Interface, on or before Jun. 2017, 1 page.
"Class /IWBEP/CL_V4_ABS_DATA_PROVIDER," retrieved from https://help.sap.com/saphelp_nw75/helpdata/en/17/472a92233d4f5c8ca428eb79f710cb/content.htm, on or before Jun. 2017, 3 pages.
"Class: OData::Operation," retrieved from http://www.rubydoc.info/github/visoft/ruby_odata/OData/Operation, on or before Jun. 2017, 2 pages.
"Common Schema Definition Language (CSDL) (OData Version 3.0)," retrieved from http://www.odata.org/documentation/odata-version-3-0/common-schema-definition-language-csdl/, on or before Jun. 2017, 55 pages.
"Creating an OData Model," retrieved from https://help.hana.ondemand.com/webide_odatamodeler/frameset.htm?ce16f9155a45472c98a557782c89826f.html, on or before Jun. 2017, 1 page.
"Creating an OData Service with SAP," retrieved from http://www.abapninja.com/creating-an-odata-service-with-sap/, on or before Jun. 2017, 12 pages.
"Creating and Configuring an ICF Service," retrieved from https://help.sap.com/saphelp_erp60_sp/helpdata/en/55/33a83e370cc414e10000000a114084/frameset.htm, on or before Jun. 2017, 2 pages.
"Creating the OData Channel Runtime Class," retrieved from https://help.sap.com/saphelp_gateway20sp12/helpdata/en/d7/1bb4c641204f4e9b574fc00315986c/content.htm, on or before Jun. 2017, 6 pages.
"Data Format," retrieved from http://cdn.cdata.com/help/RDA/ado/RSBOData_p_DataFormat.htm, on or before Jun. 2017, 3 pages.
"Data Modeling in SAP Gateway—maximize performance at all levels," retrieved from http://www.innovapptive.com/resources/whitepaper/pdf/Data%20Modelling.pdf on or before Jun. 2017, 14 pages.
"Data types mappings," retrieved from http://forums.devart.com/viewtopic.php?t=15942, on or before Jun. 2017, 14 pages.
"Difference between SAP Gateway and SAP Netweaver Gateway," retrieved from https://archive.sap.com/discussions/thread/3564048, on or before Jun. 2017, 8 pages.
"Entity Data Model: Primitive Data Types," retrieved from Sep. 14, 2019, https://msdn.microsoft.com/en-us/library/ee382832(v=vs.110).aspx, 2 pages.
"Entity Framework," retrieved from https://en.wikipedia.org/wiki/Entity_Framework, on or before Jun. 2017, 9 pages.
"Enum Operation.Type," retrieved from https://olingo.apache.org/javadoc/odata4/org/apache/olingo/commons/api/data/Operation.Type.html, on or before Jun. 2017, 3 pages.
"Extensibility-Guide-1072," retrieved from https://help.sap.com/http.svc/rc/880bf1d5aa0642d4b718ca1530ccd131/1702%20YMKT/en-US/loioda70d053fdd61823e10000000a44538d.pdf, on or before Jun. 2017, 200 pages.
"Generate C# classes from OData metadata," retrieved from http://wp.sjkp.dk/generate-c-classes-from-odata-metadata/, on or before Jun. 2017, 10 pages.
"How to build an OData Service with Olingo V4 Part 3: Write operations," retrieved from https://olingo.apache.org/doc/odata4/tutorials/write/tutorial_write.html, on or before Jun. 2017, 11 pages.
"How to remove unnecessary metadata in the gateway service output? Pls help!," retrieved from https://archive.sap.com/discussions/thread/3602942, on or before Jun. 2017, 9 pages.
"How to Secure Your SAP Connections," retrieved from http://blog.qosit.eu/how-to-secure-your-sap-connections/, on or before Jun. 2017, 13 pages.
"HTTP Request Handler," retrieved from https://help.sap.com/saphelp_nw74/helpdata/en/48/cae8f3356c3254e10000000a42189b/frameset.htm, on or before Jun. 2017, 2 pages.
"ICF Configuration," retrieved from https://help.sap.com/saphelp_uiaddon10/helpdata/en/4c/5bd54a97817512e10000000a42189b/frameset.htm, on or before Jun. 2017, 4 pages.
"ICF Services," retrieved from https://help.sap.com/saphelp_nw74/helpdata/en/a5/f72651c294256ee10000000a445394/frameset.htm, on or before Jun. 2017, 6 pages.
"Instantiating an OData Model," retrieved from https://openui5.hana.ondemand.com/1.36.7/docs/guide/6c47b2b39db9404582994070ec3d57a2.html, on or before Jun. 2017, 11 pages.
"Internet Communication Framework," retrieved from https://help.sap.com/saphelp_nw70/helpdata/en/36/020d3a0154b909e10000000a114084/frameset.htm, on or before Jun. 2017, 2 pages.
"Introducing JSON," retrieved from http://www.json.org/, on or before Jun. 2017, 8 pages.
"MetadataDocument cached ‚So updation in server OData service model causing issue #301," retrieved from https://github.com/object/Simple.OData.Client/issues/301, on or before Jun. 2017, 3 pages.
"Model-defined function," retrieved from https://msdn.microsoft.com/en-us/library/ee382833(v=vs.110).aspx, on or before Jun. 2017, 2 pages.
"Node.js," retrieved from https://en.wikipedia.org/wiki/Node.js, on or before Jun. 2017, 9 pages.
"Object-relational mapping," retrieved from https://en.wikipedia.org/wiki/Object-relational_mapping, on or before Jun. 2017, 4 pages.
"oData and JSON payload examples," retrieved from https://blogs.msdn.microsoft.com/leohu/2013/10/04/odata-and-json-payload-examples/, on or before Jun. 2017, 7 pages.
"Odata and SAP NetWeaver Gateway Reading Sample—Chapter 5 Introduction to OData Service Creation," retrieved from https://s3-eu-west-1.amazonaws.com/gxmedia.galileo-press.de/leseproben/3431/readingsample_sappress_odata_and_sap_netweaver_gate_way_new.pdf, on or before Jun. 2017, 34 pages.
"OData and SAP Netweaver Gateway. Part I. Introduction," retrieved from http://www.sapyard.com/odata-and-sap-netweaver-gateway-part-i-introduction/, on or before Jun. 2017, 16 pages.
"OData and SAP Netweaver Gateway. Part II. Create your first OData Service," retrieved from http://www.sapyard.com/odata-and-sap-netweaver-gateway-part-ii-create-your-first-odata-service/, on or before Jun. 2017, 32 pages.
"OData Version 3.0 Core Protocol," retrieved from http://www.odata.org/documentation/odata-version-3-0/odata-version-3-0-core-protocol/, on or before Jun. 2017, 35 pages.
"Open Data Protocol," retrieved from https://en.wikipedia.org/wiki/Open_Data_Protocol, on or before Jun. 2017, 8 pages.
"Operations (OData Version 2.0)," retrieved from http://www.odata.org/documentation/odata-version-2-0/operations/, on or before Jun. 2017, 21 pages.
"Overview (OData Version 2.0)," retrieved from http://www.odata.org/documentation/odata-version-2-0/overview/, on or before Jun. 2017, 9 pages.
"Performance Aspects," retrieved from https://help.sap.com/saphelp_uiaddon20/helpdata/en/5a/0d286c5606424b8e0d663c87445733/frameset.htm, on or before Jun. 2017, 2 pages.
"Progress DataDirect Cloud," retrieved from https://documentation.progress.com/output/DataDirect/DataDirectCloud/index.html #page/odata/supported-odata-version,-operations,-and-data-ty.html, on or before Jun. 2017, 1 page.

(56) References Cited

OTHER PUBLICATIONS

"Property Metadata Binding," retrieved from https://help.sap.com/saphelp_nw74/helpdata/en/f5/aa4bb75c20445194494b264d3b3cd2/frameset.htm, on or before Jun. 2017, 1 page.
"Queryable OData Metadata," retrieved from http://www.odata.org/blog/queryable-odata-metadata/, on or before Jun. 2017, 10 pages.
"SAP BAPI Tutorial—Step by Step Guide to Create BAPI in ABAP," retrieved from http://www.guru99.com/all-about-bapi.html, on or before Jun. 2017, 8 pages.
"SAP Gateway and OData," retrieved from https://www.sap-press.com/sap-gateway-and-odata_3904/, on or before Jun. 2017, 3 pages.
"SAP Gateway Foundation (SAP_GWFND)," retrieved from https://help.sap.com/saphelp_nw74/helpdata/en/ad/612bb3102e4f54a3019697fef65e5e/frameset.htm, on or before Jun. 2017, 4 pages.
"SAP Gateway Foundation Configuration Guide," retrieved from https://help.sap.com/saphelp_nw75/helpdata/en/ea/f72651c294256ee10000000a445394/frameset.htm, on or before Jun. 2017, 1 page.
"Serialization," retrieved from https://en.wikipedia.org/wiki/Serialization, on or before Jun. 2017, 8 pages.
"Server Architecture," retrieved from https://help.sap.com/saphelp_nw74/helpdata/en/48/d181c6f6c96745e10000000a421937/frameset.htm, on or before Jun. 2017, 4 pages.
"Step 4: Smart Form," retrieved from https://sapui5.netweaver.ondemand.com/1.30.6/docs/guide/f712d30f9e2d4abd9670263f89542f2b.html, on or before Jun. 2017, 3 pages.
"Using data provider for EF4.x and EF6 in parallel," retrieved from http://sqlanywhere-forum.sap.com/questions/25071/using-data-provider-for-ef4x-and-ef6-in-parallel, on or before Jun. 2017, 3 pages.
"What is bapi and what is badi," retrieved from https://archive.sap.com/discussions/thread/789526, on or before Jun. 2017, 11 pages.
"What is data serialization?," retrieved from https://stackoverflow.com/questions/11817950/what-is-data-serialization, on or before Jun. 2017, 5 pages.
"What is the relationship between OData , Atom, JSON and WCF Data Service," retrieved from https://stackoverflow.com/questions/11680595/what-is-the-relationship-between-odata-atom-json-and-wcf-data-service, on or before Jun. 2017, 3 pages.
Chavara, Abyson Joseph, "A step by step guide for beginners on user defined BAPI creation," retrieved from https://wiki.scn.sap.com/wiki/display/ABAP/A+step+by+step+guide+for+beginners+on+user+defined+BAPI+creation, on or before Jun. 2017, 15 pages.
Chobe, Utsav, "OData Enablement for BPM & CAF (PO Stack)—Façade Way," retrieved from https://blogs.sap.com/2014/04/14/odata-endpoints-for-po-stack-bpm-caf-facade-way/, on or before Jun. 2017, 9 pages.
Deshpande, Vardhaman, "Improving REST API performance with JSON Light," retrieved from http://www.vrdmn.com/2014/06/improving-rest-api-performance-in.html, on or before Jun. 2017, 4 pages.
Errata 03, retrieved from http://docs.oasis-open.org/odata/odata/v4.0/errata03/os/complete/part3-csdl/odata-v4.0-errata03-os-part3-csdl-complete.html#_Vocabulary_Terms, on or before Jun. 2017, 73 pages.
Joseph, Abyson, "A simple overview on SAP Netweaver Gateway," retrieved from https://blogs.sap.com/2013/01/24/a-simple-overview-on-sap-netweaver-gateway/, on or before Jun. 2017, 12 pages.
Keller, Horst, "ABAP News for Release 7.40—Inline Declarations," retrieved from https://blogs.sap.com/2013/05/23/abap-news-for-release-740-inline-declarations/, on or before Jun. 2017, 85 pages.
Lauzon, Vincent-Philippe, "An overview of Open Data Protocol (OData)," retrieved from https://www.codeproject.com/Articles/90365/An-overview-of-Open-Data-Protocol-OData, on or before Jun. 2017, 6 pages.
Le, Long, "Node.js : Building Web Apps on the MEAN Stack with OData in Microsoft Azure," retrieved from https://msdn.microsoft.com/en-us/magazine/dn857363.aspx, on or before Jun. 2017, 26 pages.
Mahajan, Chandrashekhar, "Let's code association/navigation and data provider expand in OData service!," retrieved from https://blogs.sap.com/2014/09/24/lets-code-associationnavigation-and-data-provider-expand-in-odata-service/, on or before Jun. 2017, 48 pages.
Mahajan, Chandrashekhar, "Let's code CRUDQ and Function Import operations in OData service!" retrieved from https://blogs.sap.com/2014/03/06/let-s-code-crudq-and-function-import-operations-in-odata-service/#jive_content_id_6_Function_Import_, on or before Jun. 2017, 29 pages.
Smith, Wayne, "MBOFacade Offline OData service for SMP 3.0 SP11 MBO server," retrieved from https://blogs.sap.com/2016/11/04/mbofacade-offline-odata-service-for-smp-3.0-sp11-mbo-server/, on or before Jun. 2017, 20 pages.
Tammen, Helmut, "OData Server for Node.js" retrieved from https://blogs.sap.com/2015/11/14/odata-server-for-nodejs/, on or before Jun. 2017, 11 pages.
Todd, Paul, "The OData EDM or Entity Data Model," retrieved from https://blogs.sap.com/2013/03/13/the-odata-edm-or-entity-data-model/, on or before Jun. 2017, 3 pages.
Wasson, Mike, "Entity Relations in OData v4 Using asp.net Web API 2.2," retrieved from https://docs.microsoft.com/en-us/aspnet/web-api/overview/odata-support-in-aspnet-web-api/odata-v4/entity-relations-in-odata-v4, on or before Jun. 2017, 4 pages.

* cited by examiner

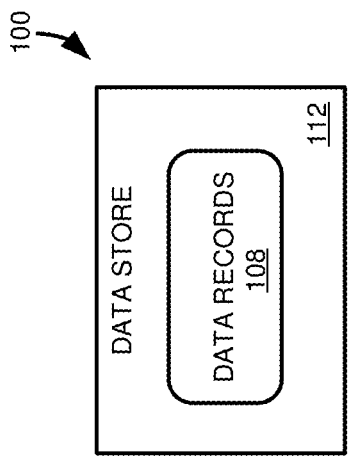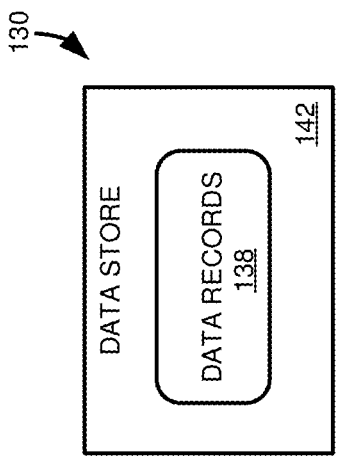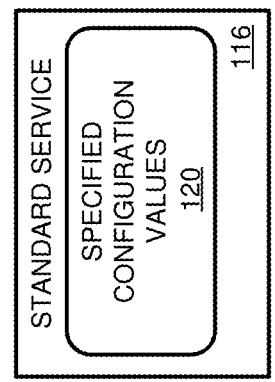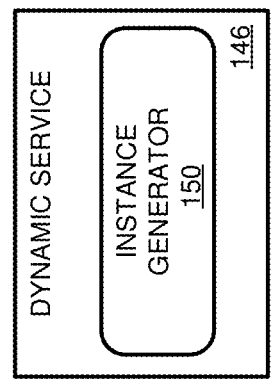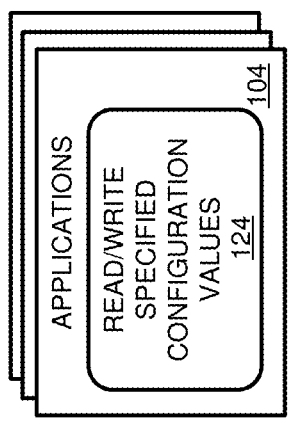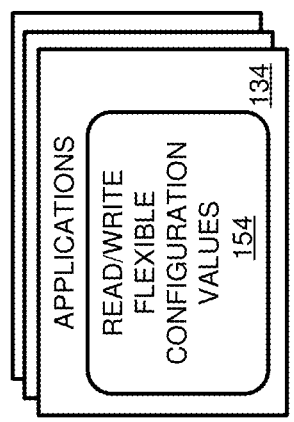
FIG. 1A
FIG. 1B

FIG. 8A

| Description | Acceptable Range | Number of Inputs | Result |
|---|---|---|---|
| Nitrogen Level | <53% | 1 | Enter ∨ |
| Measured Weight | 2.32 to 4.95 grams | 0/4 | |
| Consistency Verification | PASS/FAIL | 1 | |

Enter Results

| | | |
|---|---|---|
| 1 | 4.23 | grams |
| 2 | 3.17 | grams |
| 3 | 3.09 | grams |
| 4 | | grams |

Save  Cancel 840, 842, 844

FIG. 8C

| Description | Acceptable Range | Number of Inputs | Result |
|---|---|---|---|
| Nitrogen Level | <53% | 1 | 34 |
| Measured Weight | 2.32 to 4.95 grams | 0/4 | Average: 3.50 ∨ |
| Consistency Verification | PASS/FAIL | 1 | Pass ∨ |

804a, 804b, 804c, 804d; 808a, 808b, 808c; 860

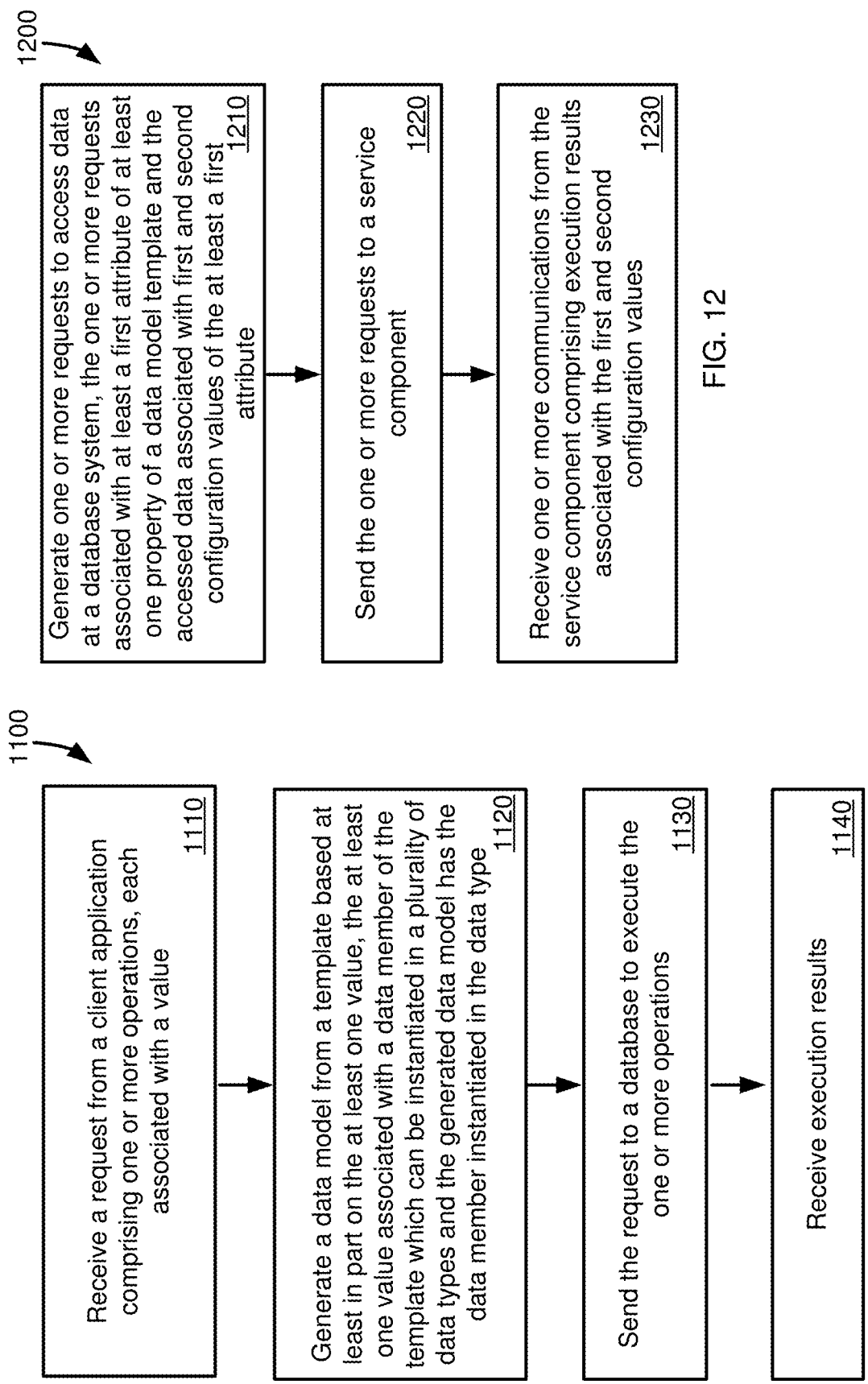

DYNAMIC, VARIABLE-DATA ATTRIBUTE DATA SERVICE

BACKGROUND

Personal or organizational data is often stored at a central location that can be accessed by one or more remote devices. Software applications can be written that run on the remote, or client, devices and send data to, and receive data from, the central location. In many cases, rather than directly retrieving data from a data store, such as a database, a client device sends data requests (e.g., to read or update data) to a data service, which may be located on the same computer system as the data store or on a different computer system. The data service can process data requests from the client device, including translating data to and from a representation used by the client device and a representation used in the data store.

Typically, a data service is set up to process data requests in a specific way. That is, the data service expects clients to request particular data fields having particular data types, or to send updates for particular data fields in particular data types. Such a data service can be advantageous, as it can avoid each client application having to implement functionality provided by the data service. However, client applications are typically limited to using particular data attributes, such as a particular data type for a particular data field, which can limit flexibility in creating client applications.

In some cases, a client application may use multiple data attributes for a particular field by using multiple data services, or multiple data models for a data service. However, the use of multiple models or services can increase the number of requests sent between the client application and the data service, and between the data service and the database, which can consume computing resources and increase response time. Also, data services typically transfer large amounts of metadata to a client application when a connection is established, thus causing applications to be less responsive. Accordingly, room for improvement exists in data services that mediate access to data.

SUMMARY

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

The disclosed innovations relate generally to facilitating interactions between a client application, a dynamic data service, and a database, where the dynamic data service mediates data access requests to the database on behalf of the client application. The dynamic data service can use a data model template, where the data model template can be used to instantiate data members, and optionally attributes and methods related to the data members, based on configuration values associated with a client request. For example, a configuration value may be used to set a data type for a data member, a data type for an attribute of a data member, to add or remove an attribute of the data member, to set or unset an attribute of a data member, to create or modify a binding associated with the data member, or to add or remove a method associated with the data model template. Thus, the dynamic service is not limited to a single, predefined model, such as a model having static predefined data types for data members, but can adapt to specific configuration values associated with the client request.

An embodiment can be implemented as one or more computer-readable media comprising computer-executable instructions that, when executed, cause a computing system to perform processing to process a request for database operations. The processing includes receiving a request from a client application to access data stored in a database system. The database system is located remotely to a computing device on which the client application is executing. However, in some aspects, the database system is not located remotely to the client application.

A data model template associated with the request is determined. The data model template specifies at least one object comprising one or more properties. At least one of the one or more properties has at least a first attribute capable of being instantiated in a plurality of configuration values. A configuration value is determined in which at the at least a first attribute should be instantiated to execute the request. The at least one object is instantiated with the at least a first attribute instantiated in the determined configuration value. The request is sent to the database system for execution. Execution results are received from the database system and sent to the client application.

An embodiment can be implemented as a system comprising memory; one or more hardware processors coupled to the memory; and one or more computer-readable media storing instructions that, when loaded into the memory, cause the one or more hardware processors to perform operations for processing a request for one or more database operations. The operations carried out by the processor include receiving a request from a client application. The request comprises one or more operations to be carried out at a database. The one or more operations are associated with at least one value having a data type.

A data model is generated from a data model template based at least in part on the data type of the at least one value. The at least one value is associated with a data member of the data model template and the data member can be instantiated in a plurality of data types. The generated data model has the data member instantiated in the data type of the at least one value. A request is sent to the database to execute the one or more operations. Execution results are received from the database and sent to the client application. At least one of sending a request to the database and receiving execution results from the database comprises assigning the value in the data type to the data member.

An embodiment can be implemented as a method carried out at least in part by a computing system associated with a client device. The method includes, in association with a single session with a data service, generating one or more requests to access data at a database system. The database system is in communication with the data service. The data service is in communication with the client device. The request is associated with at least a first attribute of at least one property of a data model template and the accessed data is associated with first and second values of the at least a first attribute. The one or more requests are sent to the data service. One or more communications are received from the data service. The one or more communications comprise execution results associated with the first and second configuration values.

The various innovations can be used in combination or separately. As described herein, a variety of other features and advantages can be incorporated into the technologies as desired. The foregoing and other objects, features, and advantages of the invention will become more apparent from the following detailed description, which proceeds with reference to the accompanying figures.

BRIEF DESCRIPTION OF THE DRAWINGS

FIG. 1A is a block diagram of an architecture in which a standard data service can process requests for database operations using a data model having static, specified data types.

FIG. 1B is a block diagram of an architecture in which a dynamic data service can process requests for database operations by dynamically generating data members having an appropriate data type for the request.

FIGS. 8A-8C are example user interface screens illustrating how a dynamic data service according to an embodiment of the present disclosure can provide enhanced functionality.

FIG. 11 is a flowchart of an example method of servicing a client request for database operations using a dynamic data service according to an embodiment of the present disclosure.

FIG. 12 is a flowchart of an example method of generating a client request to be serviced by a dynamic data service according to an embodiment of the present disclosure.

DETAILED DESCRIPTION

Example 1—Example Overview

Figure 2:
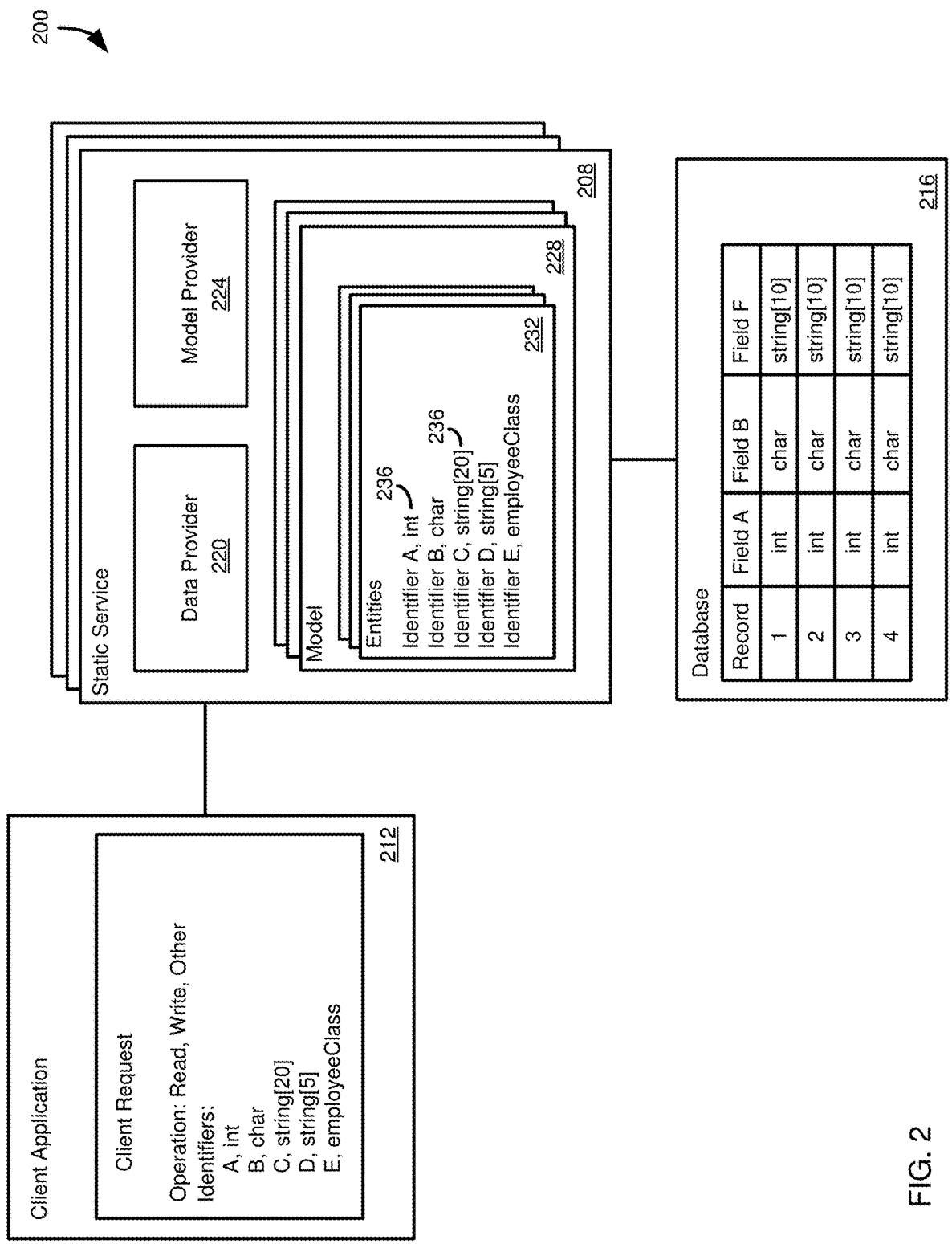
FIG. 2 is a block diagram of a scenario where a client application is limited to using data types specified in a data model used by a static data service.

Personal or organizational data is often stored at a central location that can be accessed by one or more remote devices. Software applications can be written that run on the remote, or client, devices and send data to, and receive data from, the central location. In many cases, rather than directly retrieving data from a data store, such as a database, a client device sends data requests (e.g., to read or update data) to a data service, which may be located on the same computer system as the data store or on a different computer store. The data service can process data requests from the client device, including translating data to and from a representation used by the client device and a representation used in the data store.

Typically, a data service is set up to process data requests in a specific way. That is, the data service expects client applications to request particular data fields having particular data types, or to send updates for particular data fields in particular data types. Such a data service can be advantageous, as it can avoid each client application having to implement functionality provided by the data service. However, client applications are typically limited to using particular data attributes, such as a particular data type for a data field, which can limit flexibility in creating client applications.

FIG. 1A illustrates a typical scenario 100 where one or more client applications 104 can access data, such as data records 108 (e.g., maintained in tables or another format) in a data store 112 (e.g., a database). Access to the data of the data store 112 by a client application 104 is mediated by a standard service 116. The standard service 116 can use a service-oriented architecture, including web services implemented via a SOAP (Simple Object Access Protocol) service or a REST (representational state transfer) service, or another type of service. In a particular example, the standard service 116 uses the OData (open data) protocol.

The standard service 116 typically uses one or more instances of one or more specified configuration values 120 to mediate the transfer of information between the client applications 104 and the data store 112. For instance, the standard service 116 may use a particular model for a particular request, where the model specifies particular data fields in particular data types (where a data type can be a particular configuration value for a particular property, such as a data member, associated with the model, including for a particular attribute of the property). For instance, a "name" field might be specified as a string of characters (e.g., a string object or a character array) having a maximum length of twenty-five characters. A "result" field may be specified as an integer value.

As the service 116 mediates the transfer of information between a client application 104 and the data store 112, in order to use the service, both the client application and the data store typically need to conform to the model used by the service, including the specified configuration values (such as particular data types). Thus, when a client application 104 is developed, its functionality, such as read/write operations 124, may be limited to the specific configuration values available through (and specified for) the service 116 (e.g., data types specified in a model used by the service).

As an example, if "result" is specified as an integer (e.g., a particular configuration value for a value type attribute of a property associated with the model), the client application 104 may not be able to use a Boolean value, a float, a string or character array, or an abstract data type (e.g., class instance) with the "result" field. Although data may be maintained in these data types in the data store 112, the data may not be retrievable or modifiable by client applications 104. Thus, the data may be maintained in another, potentially less useful format, or the data may be inaccessible by at least certain client applications 104, which can limit the utility of the data. Thus, room for improvement exists in data services that mediate access to data.

FIG. 1B illustrates a scenario 130 according to an aspect of the present disclosure. The scenario 130 includes one or more client applications 134 that can access data, such as data records 138 (e.g., database tables or data maintained in another format), stored in a data store 142 (e.g., a database). Access to the data records 138 by the client applications 134 can be mediated by a dynamic (or open) service 146. The dynamic service 146 can use a service-oriented architecture, including web services implemented via a SOAP (Simple Object Access Protocol) service or a REST (representational state transfer) service, or another type of service. In a particular example, the dynamic service 146 uses the OData (open data) protocol.

In contrast to the standard service 116, the dynamic service 146 does not maintain a fixed model. That is, while some attributes associated with a model, or a model template, might have specified configuration value (such as a data type), at least one other attribute, and typically a plurality of attributes, can have one of a plurality of configuration values. When an attribute can have one of a plurality of configuration values, the configuration value can be specified by a client application 134 (e.g., in requests 154 to read or modify data), by the data store 142, including based on properties or attributes associated with the data records 138, or can be specified in another manner. The dynamic service 146 can include an instance generator 150, which can generate instances of properties having attribute configuration values that are specified by another source (e.g., a client application 134 or the data store 142).

Thus, the scenario 130 depicts how at least certain disclosed innovations can provide enhanced flexibility for developing client applications 134 and maintaining data in a data store 142. A client application 134 can be developed to use data in any format used in the data store 142, or an attribute can be assigned a configuration value associated with a configuration value used in the data store (e.g., a data type for the data in the data store, including a data type into which the data type of the data store can be coerced or casted). Even though the client applications 134 can be designed with greater flexibility, and potentially functionality, they can use the dynamic service 146 rather than having to implement specific functionality for directly accessing the data store 142.

The disclosed innovations provide improved functionality dynamic services 146. Rather than having different services, or different models, for different configuration values that may be used by different client applications 134, a single dynamic service 146 can provide the desired functionality. By generating properties having attributes with the appropriate configuration values with the properties are needed, the dynamic service 146 can support providing additional configuration values/functionality to client applications 134 without having to update the service, or create additional services or data models, whenever new functionality is to be added. Correspondingly, the disclosed innovations can improve the utility of data in the data store 142, and can allow the data to be stored more flexibly (e.g., in one or more data types that might be most useful for client applications 134, without being limited by specific data types support by the standard service 116).

Example 2—Example Technical Solution

The technical solution can facilitate the transfer of data between a client application and a database. A disclosed innovative dynamic service can service requests from the client application without sending significant amounts of metadata from the data service to the client application. Typical, non-dynamic data services send metadata, such as about a model used by the service, to the client, which can make client applications slower to load and less responsive. In addition, the transmission of this metadata can use computing resources, including network bandwidth, processor time, and memory.

The disclosed innovations can also allow multiple configuration values (such as different data types for a particular attribute of a particular property of an entity defined in a data model template) to be used in a client application, and requests for data operations at a database processed, with a single service or a single entity, rather than, for example, using a different service or entity for each configuration value for a particular data field used in the client application. Thus, multiple configuration values can be specified in one or more requests (including, in some cases, a single request) from the client application to the dynamic data service, and in turn a communication from the data service to the database. This can reduce execution time, development time, and the use of computing resources compared with scenarios where a client application would send multiple requests to multiple services (or to a multiple models accessed by a single service) to use different configuration values for an attribute.

Example 3—Example Advantages

As described in Example 2, the technical solution can allow greater flexibility in creating client applications, as the client application will have fewer limitations on the data useable in the application. In particular, a dynamic data service can use a model template that can accept a plurality of configuration values, rather than set configuration values, which may make the model template useable in a wider range of client applications than a model that uses static configuration values. The model template can also be more robust, as it is more likely to accommodate new use cases and new client applications without requiring changes to a static service or its data model. The dynamic data service can also provide for enhanced security by encrypting and decrypting data content in carrying out operations using the model template (including particular models instantiated from the data model template based on specified configuration values).

Correspondingly, the disclosed innovations can also facilitate the creation and maintenance of data services. A single service can be created rather than having multiple services, and the service can be used with a wider variety of client applications. A more adaptable service can reduce the need for modifying the service, or data model, to accommodate new or changed use cases.

As described in Example 2, the dynamic service can reduce metadata transferred to the client from the data service, and can reduce the number of requests from the client to the data service, and from the data service to the database, or the number of data services or data service implementations needed to carry out a task. The reduced volume of data, reduced number of requests, or reduced number of services or implementations can improve the performance of the client application. For instance, the client application may load more quickly because of the reduced amount of metadata sent to the client application from the data service. The client application may be more responsive because operations involving the database may execute more quickly given that fewer requests need to be sent or processed.

Example 4—Example Scenario with Static Data Service

FIG. 2 illustrates a scenario 200 that can arise when using typical data access services, such as described in FIG. 1A. The scenario 200 includes a static service component 208. The static service component 208 can mediate data transfer between a client application 212 and a database 216. The static service component 208 can include a data provider 220 and a model provider 224. The model provider 224 can make various data, and data operations, available to the client application 212. For example, the model provider 224 can access one or more models 228, where the models describe data, data relationships, and available data operations.

Each model 228 can include one or more entities 232. An entity 232 can be a collection of one or more data members 236, each having an attribute, such as a data type, having a specific configuration value (e.g., a particular data type for the attribute). An entity 232 can specify operations that can be carried out using the data members 236, and can specify relationships with other entities 232. In particular examples, an entity 232 can be, or can be analogous to, and abstract data type, such as a class (e.g. the entity can have one or more data members and can provide one or more operations or public methods, including operations or methods involving the data members).

While the model provider 224 can make the data members 236, data operations, and relationships available to the client application 212, the data provider 220 can fetch the corresponding data from (or sent data from the client application to be applied to) the database 216. Values retrieved from the database 216 can be assigned to the appropriate data members 236 of the appropriate entity 232, or values received from the client application 212 can be assigned to the data members, and then sent to be applied to the database.

In the scenario 200, the particular attribute configuration values (e.g., in this scenario, specified data types) of the data members 236 constrain both the client application 212 and the database 216. For instance, data members 236 include an identifier D, a string object having a maximum length of five characters. The client application 212 can request data associated with identifier D, or assign data to identifier D, but must use the same data type as specified in the model 228 for the entity 232. Similarly, identifier D can only be mapped to database fields that are strings having a maximum of five characters.

Models 228, and entities 232, can be designed to represent analog-world features. For instance, an organization may have a quality-control program where products, components, ingredients etc. are measured and evaluated. Entities 232 associated with a model 228 for the program might include an entity that represents an employee carrying out testing, an entity that represents a product, an entity that represents a component or ingredient of the product, an entity that represents a supplier or source of the component or ingredient, an entity that represents a customer for the product, and an entity that represents a particular test and its parameters.

In some cases, the client application 212 may initially use a default model 228, such as a model provided by a software vendor. In other cases, the client application 212 may initially use a custom-designed model. However, over time, the requirements for the quality-control program may change, such that the default or original custom-designed model no longer includes the appropriate features for an intended use. Or, the original model 228 may still be useable for some aspects of the client application 212, but the client application may include other aspects that use data members 236 and/or configuration values (e.g., particular data types) that are not supported by, and may be inconsistent with, the original model.

As an example, identifier D may represent a five character code used to indicate the results of a particular test of a quality-control program. Over time, another test may be introduced (in addition to, or in place of an original test) where results are described using another data type, such as a longer string, an integer, a float, a Boolean value, or an instance of an abstract data type. Traditionally, the new test would either be unusable with the service component 208, unless the service component (including a definition of a model 228 or entity 232) were redesigned. The redesign may be time consuming and expensive, may conflict with data members/data types needed for the original test, and may conflict with other users of the service component 208. For instance, one organization may have transitioned to a new test, while another organization retained the original test. It may not be possible to redefine a typical, static service component 208 in a way that can accommodate both the new test and the old test. Even if the static service component 208 can be redesigned, it can introduced additional development time and cost, and data complexity.

Example 5—Example Scenario with Dynamic Data Service

Figure 3:
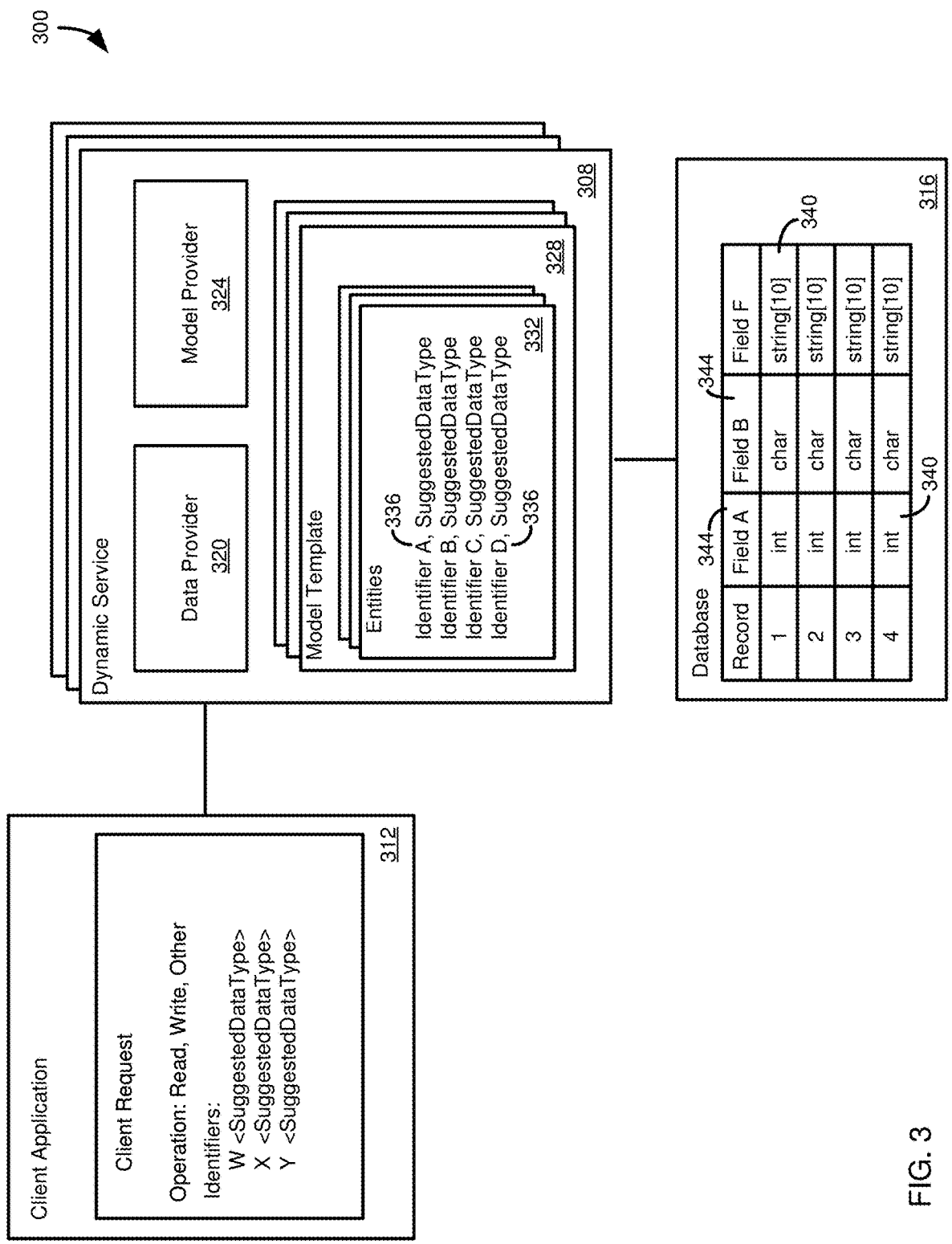
FIG. 3 is a block diagram of a scenario where a dynamic data service includes a model template that can be used to dynamically generate data members in data types specified in a client request, in a default value in the template, or by database execution results.

FIG. 3 illustrates a scenario 300 according to a disclosed innovation. The scenario includes a dynamic, or open (or custom), service component 308. Like the service component 208, the dynamic service component 308 can mediate data transfer between a client application 312 and a database 316. The dynamic service component 308 can include a data provider 320 and a model provider 324, which can have analogous functionality to the data provider 220 and the model provider 224.

The dynamic service component 308 can include one or more model templates 328, which can include one or more entities 332. The model templates 328 and entities 332 can be generally similar to the models 228 and entities 232. However, unlike the models 228, at least a portion of data members 336 of an entity 332 do not include a fixed attribute values (for at least some attributes of at least some data members). In some cases, the configuration value can be supplied, or suggested, by the client application 312. For instance, the client application 312 can request read, write, and optionally other operations, from the service component 308. A request to write, or otherwise manipulate data (e.g., create, update, or delete operations) can include a suggested data type (or other configuration value) associated with the request. The suggested data type (or other configuration value) can be used to instantiate appropriate, corresponding data type in the model template 328, or confirm that the appropriate data type instances have been instantiated.

The dynamic service component 308 can take corrective action if the instantiated data members do not have the appropriate configuration values (e.g., appropriate data types are not instantiated), such as when a request from a client application 312 is received, when data is received from the database 316, or both. For instance, when a client request is received, the service component 308 may include instances of data members 336 associated with a previous request. If at least some, or in some cases, all, of the instantiated data members 336 of an entity 332 have the appropriate configuration values (e.g., are of the correct data type, that is, they are, are equivalent to, or at least compatible with, the data types associated with the request from the client application 312), the instantiated data members can be used with the request. For any data members 336 which are not instantiated with the correct configuration value, the dynamic service component 308 can destroy or deallocate existing data members and instantiated new data members having the correct configuration value. Similarly, if data retrieved from the database 316 does not match a configuration value of one or more instantiated data members 336, the one or more data members can be destroyed or deallocated, and the data members instantiated with the correct configuration value.

In further cases, the configuration values for the data members 336 can be supplied, or suggested, by the database 316. For instance, the data members 336 can be instantiated using data types 340 associated with fields 344 of the database 316 that are associated with a client request. In some cases, the model templates 328 can be used to instantiate data members 336 based on a default, or expected, configuration value. If data returned by the database 316 does not match configuration values of the instantiated data members 336 (e.g., a non-identical data type, or in some aspects, a data type that cannot be cast or coerced to the correct data type) the default or expected configuration values, the corresponding data members 336 can be destroyed or deallocated, and data members with the appropriate configuration values instantiated.

The scenario 300 illustrates how the dynamic service component 308 can provide enhanced flexibility for client applications 312 and the database 316. If, for example, a first database request is sent by the database client 312 and identifier W is specified as an integer, the dynamic service component 308 can instantiate a corresponding data member having an integer data type. If the database client 312 sends another request (or a request is sent by a different database client) where identifier W is specified as a string having a maximum length of ten characters, the corresponding data member can be instantiated as a string having a maximum length of ten characters. If the integer data member for identifier W was already instantiated, that instance can be destroyed or deallocated, and the data member for identifier W instantiated as a string having a maximum length of ten characters. Thus, the service component 308 can provide a model template 328 that can be implemented using a variety of data types, including for requests coming from the same client application 312 or from different client applications. The appropriate data types for data members 336 can be determined and an instantiated dynamically, without requiring reconfiguration of the dynamic data service 308 or the data model template 328.

Although this Example 5 has been described as instantiating, and optionally destroying or deallocating, instances of data members 336, the dynamic service component 308 can modify other aspects of the model template 328 as appropriate for configuration values to be used with the model template. For instance, some of the methods used to modify or manipulate data may defined based on such configuration values of the data members 336. As an example, a method to combine data members 336 from different records may be implemented differently depending on whether the data members are strings or floats. When the appropriate configuration value is determined for the data members 336, the appropriate methods can be generated by the dynamic service component 308 from the data model template 328.

Although this Example 5 generally describes the use of dynamic data types with the data model template 328 and the entities 332, the data model template can use other types of dynamic configuration values. Such configuration values will be further described as the disclosure proceeds. As an example, configuration values can include bindings between particular attributes and particular data (e.g., data maintained in a database), adding or removing a property or an attribute from the data model template, altering associations (including for inheritance purposes) between different entities 332 (including creating or removing such associations), and altering rules or other processing to be applied to data associated with a data model template (e.g., database data to be bound, including after such processing, to an instance of an object based on particular configuration values supplied for the data model template).

The present disclosure, including this Example 5, generally describes a data model being instantiated from a data model template, or modified, based on a client request (e.g., read or write requests). However, the data model can be instantiated, or modified, based on requests from other sources, including from the database. For example, a change to a data set in a database may result in a change being made to a data model or data model template. In addition, changes to the data model template can be made in response to a request, by a client, database, or another source. Changes to a data model template can include changing default configuration values, or making other changes to the data model template (e.g., adding or removing properties or attributes, changing configuration information, changing inheritance from other models or templates, changing data bindings, changing how bound data is processed, etc.).

Example 6—Example Data Model

Figure 4:
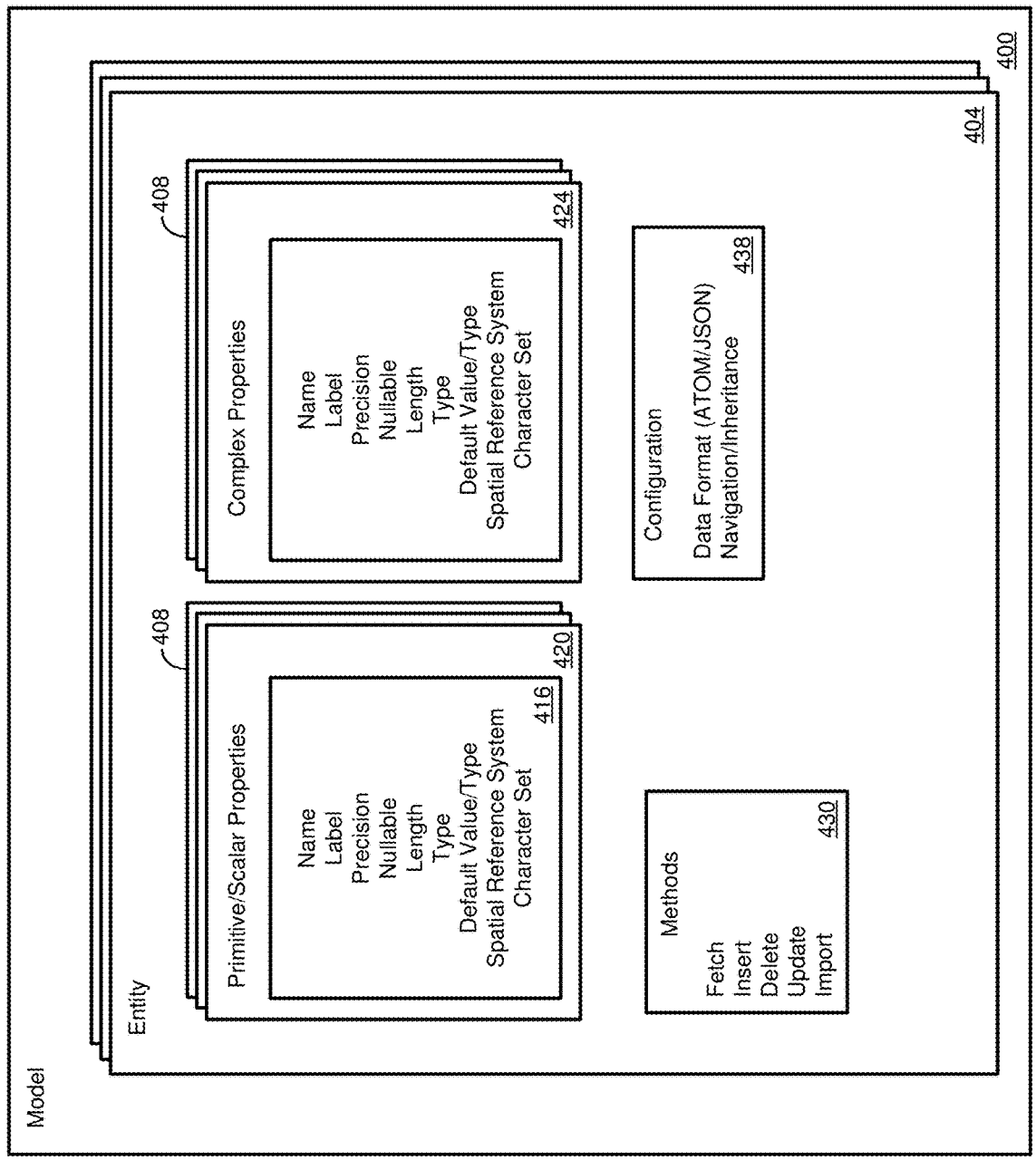
FIG. 4 is a block diagram of a data model that can be produced from a data model template according to a disclosed innovation.

FIG. 4 illustrates details of a data model 400, or schema, that can be used in conjunction with one or more disclosed innovations. The data model 400 can correspond to the model 228 of FIG. 2, and can be instantiated from the model template 328 of FIG. 3. Although a single model 400 is depicted for ease of presentation, in at least some aspects, a service component according to the present disclosure can include a plurality of model templates, and models derived therefrom. The service component can determine a particular model template for a particular client request (such as using information associated with the request, such as a URL or header associated with the request), and, at least in some aspects, generate the appropriate model using data types associated with the request. In a particular example, the model 400 (or a model template) can be specified in an Entity Data Model (EDM), such as the Common Schema Definition Language (CSDL).

The model 400 can include one or more entities 404. Multiple entities 404, including a collection of entities, can be included in the model 400. In some cases, the entities 404 can be of the same type, while in other cases the entities can be of different types.

A model 400 can be used to represent a particular application or analog-world use scenario. As described above, a model 400 may be associated with a business process, such as a quality control procedure. As another example, an application may provide account information, such as savings account, checking account, or credit card account information, for a user. Each account type may be associated with a different model, or different entities 404 of the same model 400. Or, each account type can be associated with one or more common entities 404, but the entities may have different data members (or different data types for data members), or be associated with different data content (e.g., may be bound to different data in a database) for different account types (including abstract data types for an account type).

An entity 404 typically contains one or more properties 408, which can serve as data members of the entity. However, in some cases, an entity 404 does not include any properties 408. For instance, the entity 404 may provide methods that act on other data, or that define relationships to other entities. The properties 408 can include a value for the property, having a data type, and information (e.g., attributes 416, which can be metadata) about the property. An entity 404 can include primitive or scalar properties 420, which are typically associated with primitive or scalar data types.

An entity 404 can also include one or more complex properties 424. Complex properties 424 can include one or more (typically a plurality) of primitive or scalar properties, and can include other complex properties. In at least some cases, a complex property 424 can be an entity 404. Like the primitive or scalar properties 420, the complex properties 424 can include information (e.g. attributes 416, which can be metadata) about the property.

The attributes 416 can have configuration values, which can be a value, setting, or the like for an attribute. As an example, configuration values for a "type" attribute 416 can include integer, string, float, array, etc. Configuration values for attributes 416 can include setting or unsetting an attribute (e.g., on/off or true/false), bindings between the attribute and particular data (e.g., particular data in a database that is associated with the attribute), adding or removing an attribute (e.g., a configuration value can be to not instantiate the attribute, or even the property 408).

Attributes 416 that describe a primitive or scalar property 420 or a complex property 424 typically include a name. The name can be a label or identifier used by a computing system to recognize properties 420, 424. Accordingly, in at least some cases, the name may be a unique name. In other cases, the name may not be unique, and properties 420, 424 may be referred to by names that may be determined in another manner, such as scooping rules in a computing language used to implement or manipulate the properties.

Attributes 416 can also include labels. The labels may be human-readable descriptions or identifiers of properties 420, 424. The labels may be intended to be displayed to a user along with other information about properties 420, 424, such as their values. Each property 420, 424 also can be associated with a type, which can be a data type. A data type can be a primitive data type, such as an integer, a float, a real number, a character, a Boolean type, etc. A data type can also be a constructed data type or an abstract data type. For instance, the data type can be a particular class, or a composite data type such as a structure or record. In at least some cases, whether a data type is a primitive type or a constructed, abstract, or composite data type can be defined for a particular computing system or a computing language used with the computing system. For example, a string can be implemented as an abstract data type (e.g., an instance of a string class) or as a primitive type (e.g., an array of characters).

At least certain attributes 416 may be associated with particular data types. For example, a data type associated with a temporal value (e.g., a clock time) or a decimal value can be associated with a precision, such as a number of decimal places useable with instances of the data type. This attribute 416 may be omitted, left blank, or indicated as not relevant for other data types, such as integers or Boolean values. For data types such as strings (including characters arrays) or binary streams, a length value can specify a maximum number of characters (such as in an array) that can be used to store a value of an instance of that data type.

Attributes 416 can specify a default value and/or data type for a property. For instance, newly instantiated data types can be given a default value (e.g., 0, true, a particular string) based on a particular use scenario. A default data type can be a data type that is to be used for the property unless another data type is specified, such as in a request from a client application or in response to data received from a database.

In some cases, the data type for a property 408 may not be supplied until an entity 404, and its properties, are instantiated. That is, the model 400 can represent a design-time construct/template according to a disclosed innovation where certain properties of the model are specified at design time, such as properties 408, their organization and location, interrelations between properties, and methods that can be carried out using the properties, while other properties, such as a particular data type of a property and an implementation of a method that can be carried out on the property, can be determined at runtime. In other implementations attributes 416 for a default type can be omitted, and the data type in the design-time model 400 can act as a default type, which can be overridden/redefined at runtime.

As further examples of attributes 416, a property 420, 424 can include an indicator for a spatial reference system (e.g., Cartesian, linear, spherical, polar, etc.) to be used with the property. Attributes 416 can indicate a character set to be used with properties 420, 424, such as whether the UNICODE or ASCII character sets should be used.

The model 400 can optionally specify one or more methods 430 that can be carried out using the model, or particular entities 404 or properties 408 thereof. In some cases, the model 400 can define the methods 430. That is, the model 400 can specify how the method 430 will be carried out. In other cases, the model 400 can declare the method, but the implementation details are specified elsewhere, including in a database system. For example, the methods may be accessible at the database system via a remote procedure call or similar mechanism. The methods 430 can include those used to access and manipulate data at a database system, such as CRUD operations (create, read, update, delete). The methods 430, in particular "import" methods, can be for operations that are associated with a particular use scenario for the model, including methods that accept one or more parameters from a user request. In particular aspects, the methods 430 can be attributes and can have configuration values, where a configuration value can specify particular aspects of a method, or the presence of absence of a method (including whether an instance should be instantiated with a particular method).

An entity 404 can include configuration metadata 438. The configuration metadata 438 can specify, for example, a data format for use in transmitting and receiving information associated with the entity 404. For instance, typical data formats for an OData service include the ATOM format (an XML based format) and the JSON (JavaScript Object Notation) format. Configuration metadata 438 (or attributes) can also include navigation information, which can establish links between entities 404, including for the purposes of viewing information regarding related entities or for inheritance purposes. The configuration metadata 438 can also be attributes and can be associated with a configuration value (e.g. ATOM versus JSON, particular relationships between entities 404 including inheritance, including actual values, configuration values, attributes 416, and properties).

The model 400 is provided by way of example only. The disclosed innovations are not limited to scenarios involving a model, or a model may be specified in a manner other than as depicted in FIG. 4.

Example 7—Example Architecture

Figure 5:
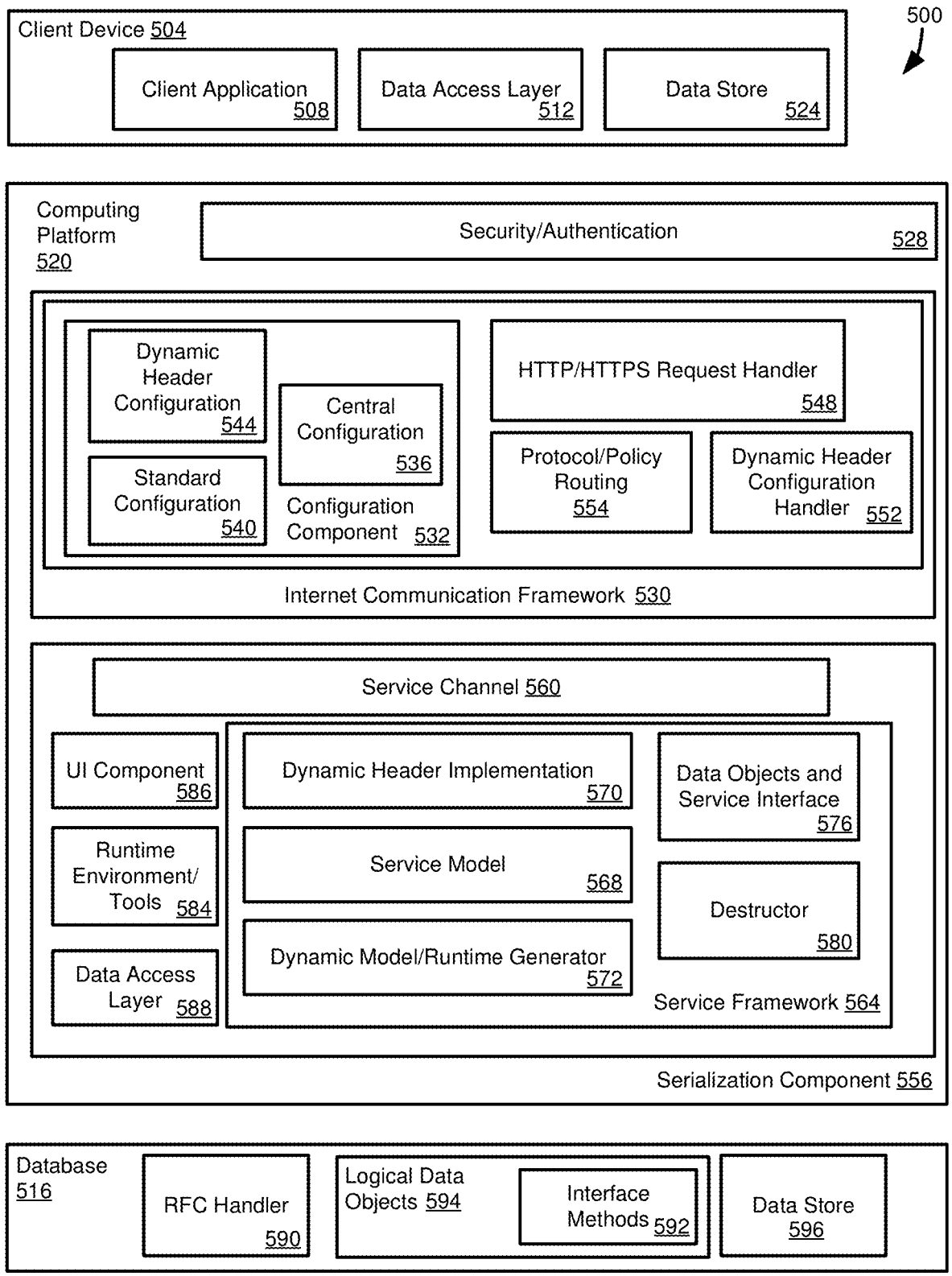
FIG. 5 is a block diagram of an architecture having a client device, a computing platform, and a database in which disclosed innovations can be implemented.

FIG. 5 illustrates an example architecture 500 in which the disclosed innovations can be implemented. The architecture 500 includes a client device 504. The client device 504 can execute one or more client applications 508. The client device 504 can include a data access layer 512 useable by a client application 508 to send data to, and receive data from, another computing system or device, such as a database 516, including through a computing platform 520 (which can function as a "middleware" component).

Data can be stored, or cached, on the client device 508 in a data store 524. For example, a portion of data stored in the database 516 may be stored in the data store 524 for more rapid access by the client application 508, or for "offline" use. The data store 524 can store information that is not stored in the database 516 including, without limitation, authorization information (e.g., a user name and password, or other authorization token).

The computing platform 520 can include a security/authentication component 528. The security/authentication component can determine whether the client device 504 (or a particular application 508 or other request source of the client device) is authorized to use the services of the computing platform 520 and/or the database 516, including a level or type of access.

The computing platform 520 can include an internet communication framework 530. The internet communication framework 530 can include a configuration component 532. The configuration component 532 can include a central configuration 536. The central configuration 536 can be initialized by a dynamic header configuration 544. The dynamic header configuration 544 can instantiate and import a standard configuration 540. The standard configuration 540 can describe the operation of aspects of the computing platform 520, including encryption and routing protocols that are available.

The central configuration 536 can determine whether a service request from a client application 508 is for a standard, or static, service or a dynamic service according to a disclosed innovation. For instance, the central configuration 536 can examine HTTP header information for the request (e.g., to look for a data object, flag, or other value indicating how the request should be processed). If the central configuration determines that the request is intended for a standard, static service, the request can be processed according to typical data access protocols, including routing the request to a HTTP/HTTPS Request Handler 548. If the request is for a dynamic service according to a disclosed innovation, the central configuration 536 can route the request to a dynamic header configuration 552.

The central configuration 536 can include additional features. For instance, the central configuration 536 can determine a type (e.g., a particular type of operation) for the request, a type (e.g., particular data that should be returned to the client application 508) for a response, if any, communications protocols to be used in processing the request, and (optionally) how to encrypt or decrypt data associated with the request (including data in a payload of the request or data to be included in a response).

The dynamic header configuration handler 552 can be responsible for executing a particular request, including returning execution results, if any, to the client application 508. In some cases, multiple dynamic header configurations can be included, such as for carrying out different types of operations, accessing different data models or entities, etc. The central configuration 536 can analyze the request, and, such as by using the dynamic header configuration 544, determine an appropriate dynamic header configuration 552 for the request, and send the request to the handler. In a particular example, a dynamic header configuration 552 can be implemented in a class (for example, a class specified in the ABAP programming language), and sending the request to the handler can include instantiating an instance of the appropriate class.

Once a request has been received by the appropriate dynamic header configuration 552, the request can be send by the handler to be executed by a serialization component 556. The dynamic header configuration 552 can access protocol/policy routing information 554 to determine how to route the request, such as depending on the protocol used for the request (e.g., ODATA, SOAP, etc.) and an operation type associated with the request (e.g., POST, GET, or a custom function).

The serialization component 556 can be responsible for causing appropriate operations to be executed to fulfill the request, including at the database 516. The serialization component 556 can include one or more service channels 560. A service channel 560 can mediate access to the database 516 using a particular service type (e.g., a REST service such as OData, a SOAP service, or another service type). In a particular example, the service channel 560 is an OData service channel. A particular service channel 560 (e.g., for a particular service channel type, like OData or SOAP) can manage (including implementing) multiple service interfaces (e.g., specific OData data services associated with specific data model templates or data models, or otherwise providing different interfaces). The service channel 560 can maintain a repository of available service interfaces, and can send a request to the appropriate interface.

The service channel 560 can access a service framework 564, such as an OData framework. The service framework 564 can include a service model 568, such as an OData model (e.g., a model or schema specified according to the OData protocol). The service model 568 can be used, for example, to process standard service requests (e.g., requests determined by the central configuration 536 to use a standard service rather than a dynamic service of the present disclosure).

The service framework 564 can also include a dynamic header implementation 570 and a dynamic model and runtime generator 572. The dynamic header implementation 570 can manage the execution of the request, including retrieving data from the database 516 and forwarding execution results, if any, to the dynamic header configuration 552.

The service model 568 can define a static model, or scheme, for a service (such as an OData service). The service model 568 can have a format at least generally similar to the model 400 of FIG. 4. The service model 568 is a static, design-time object. That is, once defined, the service model 568 is static unless the design-time object is specifically modified, in which case the modified object becomes the new, static version.

In contrast, the disclosed innovations provide a dynamic, or open, model and runtime generator 572. The dynamic model and runtime generator 572, like the service model 568, can provide a model or schema, which can be at least generally similar to the model 400 of FIG. 4. However, as described in Example 6, the configuration values of at least a portion of the attributes (including property attributes) of the model 400 (e.g., the entities 404) are not fixed at design time.

In some cases, the configuration values can be left unspecified, and the appropriate configuration value can be determined from a request or in response to execution results received from the database 516. In other cases, for properties with unspecified configuration values, a plurality of suitable configuration values can be enumerated, and an appropriate configuration value can be used to instantiate the property, such as based on the request or in response to execution results retrieved from the database 516. Thus, the dynamic model can act as a template that can be used to instantiate model components, and at least some cases a model, dynamically, based on configuration values associated with a particular request.

The model template can also be used to instantiate methods, including internal implementation methods (e.g., private methods) or interface methods for instantiated objects (and, optionally, an instantiated model based on the template). Along with instantiating the objects and methods, the dynamic model and runtime generator 572 can be used to provide access to the objects and methods, such as by creating nodes, accessible by Uniform Resource Identifiers (URIs), such as a Uniform Resource Locators (URLs) or a Uniform Resource Names (URNs), establish, manage, or remove inheritance and associations between different data models or data model templates, and objects and methods thereof.

In some cases, a model template may have components (e.g., data members or methods) that are modifiable in ways other than (or in addition to) having different configuration values for particular properties or methods. For instance, a model template may have some properties, or a property may have some attributes (e.g., specified by metadata) that can be added or removed, including based on particular data types that will be used with the model template. The dynamic model and runtime generator 572 can add, remove, or set properties, or their attributes, of the model template. Setting a property or attribute can include changing a binding between the property or attribute, such as a binding to an entity or data record or field (including a data record or field through an intermediary entity) based on particular data types associated with a request from the client application 508.

The dynamic model and runtime generator 572 and the service model 568 can access data objects and an interface 576, including to create data objects and interface methods, and at least in some cases to update or modify their properties. The data objects can be instances of entities (including their properties and methods) of the service model 568 or dynamic model and runtime generator 572. The object instances can include, for a dynamic service, the data types associated with the request and used with the model template.

The interface can be methods provided by the model (or model template), including navigational properties associated with particular entities of the model (e.g., relationships that can be used to navigate to related entities). In some cases, the dynamic model and runtime generator 572 can determine whether the data objects and interface methods 576 are valid. For instance, it can be determined whether particular configuration values supplied by a client application 508 (or supplied in execution results from the database 516) comply with underlying logic for the entity (e.g., whether a property that should be a numeric value is instead a string or character value, or whether particular numeric values are within specified bounds, such as being greater than or equal to zero).

The service framework 564 can include a destructor component 580. The destructor component 580 can be responsible for flushing objects (e.g., property instances and interface methods) associated with a particular model instance created by the dynamic model and runtime generator 572 (e.g., where properties of the model template having variable or undefined configuration values were assigned a specific configuration value). As has been described, even if the same model is used by the dynamic model and runtime generator 572 for different requests, the particular configuration values needed for properties with dynamic configuration values may differ between requests.

If the current request uses data members having different configuration values than the configuration values of the instantiated data members (or if different configuration values are needed as determined based on execution results received from the database 516), the destructor component 580 can destroy, or uninstantiate, some or all of the data objects and interface methods 576. In a particular example, the existence of instantiated data objects and interface methods 576 can be determined by the dynamic header implementation 570, and the dynamic header implementation can call the destructor component 580. The dynamic header implementation 570 can track (such as by setting a flag) when objects and interface methods 576 have been instantiated.

In some cases, the destructor component 580 can delete objects and methods from a running program. For example, the destructor component 580 can delete/deallocate properties (e.g., properties that were dynamically allocated in memory). In other cases, the destructor component 580 can terminate a running program to deinstantiate methods and objects associated with a prior request. Depending on the implementation, the destructor component 580 can be responsible for instantiating objects and methods 576 based on the configuration values associated with a new request. In other cases, instantiation can be carried out by another component, such as the dynamic mode and runtime generator 572 or the dynamic header implementation 570.

The serialization component 556 can include a runtime environment and tools component 584. The runtime environment and tools component 584 can mediate the sending and receiving of information between the serialization component 556 and the database 516. The runtime environment and tools component 584 can also implement functionality for designing, modifying, and implementing data services, include the service channel 560, the service model 568, and the dynamic model and runtime generator 572 (e.g., by allowing dynamic models to be created and modified). The runtime environment and tools component 584 can communicate with a user input component 586, which can, for example, define user interface screens and receive user input for carrying out functions of the serialization component 556.

The service framework 564 can communicate with a data access layer 588 to transfer data between the serialization component 556 and the database 516. The data access layer 588 can, for example, receive a request to modify database data from a method of the data objects and service interface 576, translate the data into a format useable by the database 516 (e.g., converting data members of an abstract data type, such as properties of a model component, into values to be inserted into particular fields of particular database records of the appropriate database tables, which can use an object relational mapping technique). Similarly, the data access layer 588 can receive a request for data from a method of the data objects and service interface, determine particular fields of particular database records from appropriate database tables to fulfill the request, format and send an appropriate request for the data to the database 516, receive results from the database, and map the results to model components (e.g., particular properties of particular entities represented in the data objects and service interface 576).

In cases where the data objects of the data objects and service interface 576 do not have the correct configuration values to receive execution results from the database 516, the data access layer 588 can cause the service framework to invoke the destructor component 580 to flush at least a portion of the existing objects. The data access layer 588 can also cause the service framework 564 to instantiate objects having the appropriate configuration values, such as by invoking the destructor 580 or the dynamic header implementation 570.

Turning to the database 516, a remote functional call (RFC) handler 590 can receive requests, including from the data access layer 588 or another component of the serialization component 556, to access particular interface methods 592 of logical data objects 594. Logical data objects 594 can be abstract data types that correspond to analog-world features (e.g., an order, a customer, an employee, etc.). In turn, the logical data objects 594 can access (or be mapped to, including to both read and update data) of a data store 596 (e.g., database tables containing the underlying data for the logical data objects). In some cases, the data access layer 588 reads or manipulates data of the data store 596 through the remote function call handler 590. In other cases, the data access layer 588 reads or manipulates data of the data store 596 in another manner, such as by accessing the data store directly, or by accessing the interface methods 592 of the logical data objects 594.

The architecture 500 can be implemented in another manner. In particular, the architecture 500 need not provide components related to a standard service. For example, a SOAP service may have both a dynamic service and a standard service and an OData service may have only a dynamic service. The dynamic service may replicate the functionality of the standard service, while providing additional functionality and flexibility. For a particular service type (e.g., SOAP, OData), it may be beneficial to provide both a dynamic service and a standard service. For instance, legacy systems may be implemented at least in part using a standard service (e.g., the models may be defined for the standard service rather than the dynamic service). However, in some aspects, a dynamic service can use models designed for a standard service and can replicate the functionality of the standard service without providing additional functionality. For some applications, a dynamic service may not be required, and runtime overhead of checking and instantiating the data objects and service interface 576 can be avoided or reduced by using a standard service.

In a specific example, the database 516 can be the HANA database of SAP SE of Walldorf, Germany. The computing platform 520 can be, or can include, the NetWeaver Gateway, also of SAP SE, of Walldorf, Germany.

Example 8—Example Write Request Processing Using Dynamic Data Service

Figure 6:
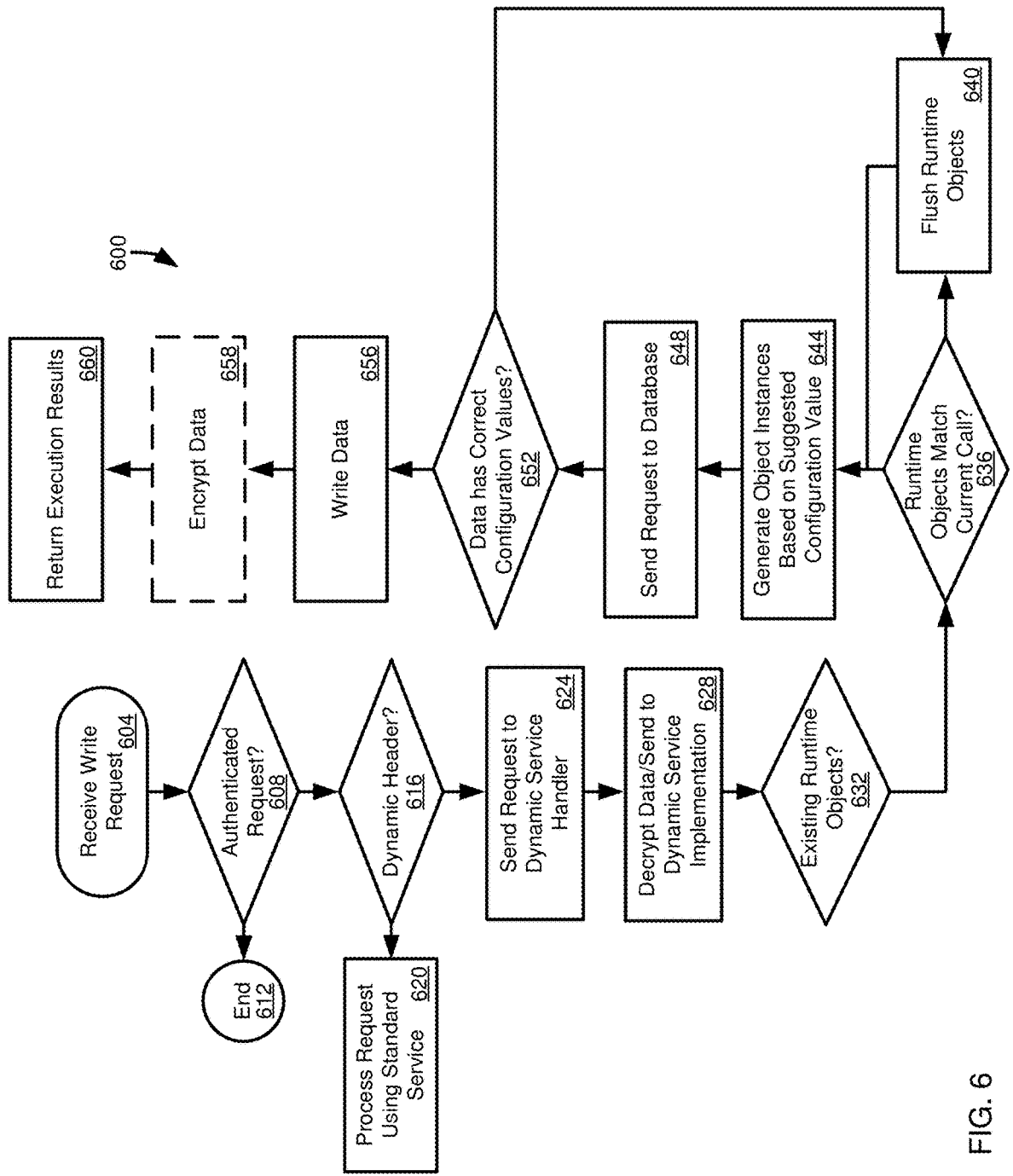
FIG. 6 is a flowchart of an example method for executing a write request from a client application using a dynamic data service according to an embodiment of the present disclosure.

FIG. 6 illustrates example operations 600 occurring during processing of a request to create, update, or delete data using a dynamic service according to a disclosed innovation. The operations 600 can be carried out, for example, using the components of the architecture 500.

At 604, a write request (e.g., a POST request using the HTTP protocol) is received. It is determined at 608 whether the request is authenticated. For instance, it can be determined whether an authorization token, such as username and password, matches authorization criteria associated with the request (e.g., credentials maintained for a user). Although shown as occurring after 604, determination 608 can be made at a different time. For instance, the determination at 608 can be made prior to receiving the write request at 604, such as when a communication session is established between a client device or application and a computing platform operating a middleware component (or otherwise implementing a dynamic service).

If the request is not authenticated, the operations 600 can terminate at 612, including sending an error message or notification to the client application. If the request is authorized, at 616, it is determined whether header information for the request indicates that a dynamic service should be used. In some cases, it is determined at 616 that a dynamic service is not indicated for use, and so the request is processed using a standard service (including a standard service of a type indicated in the request header, such a SOAP service or an OData service) at 620. If it is determined at 616 that a dynamic service should be used to process the request, the request can be sent to a dynamic service handler at 624. In some cases, such as when only a dynamic service is provided, 616 can be omitted, and the operations 600 can proceed from 608 to 624.

At 628, data associated with the request is decrypted (if encrypted in the request) and sent to a dynamic service implementation. In some aspects, 628 can be omitted. The dynamic service implementation determines an appropriate model to be used with the request and the appropriate runtime generator for use with the model template. It is determined at 632 whether existing runtime objects (and, at least in some cases, methods) exist for the model template. If runtime objects exist for the model, it is determined at 636 whether the runtime objects match, or are suitable for use with, the current request. For example, it can be determined if the runtime objects have the correct data type or other configuration value. If the runtime objects are not suitable for use with the current request, the runtime objects can be flushed at 640 (e.g., by calling the destructor component 580 of FIG. 5). If the runtime objects were determined not to exist at 632, or were determined to have the correct configuration values at 636, or after existing objects are flushed at 640, the operations proceed to 644.

At 644, objects (e.g., instances of entities and properties) are generated based on a suggested configuration value (e.g., a particular data type, binding, attribute setting, etc.). For example, the data type may be suggested in the request. For instance, a write request may have a header that specifies that the request is to be processed using the dynamic service, and the body of the request can include an identifier for a property that is to be set, a value for the property, and a suggested data type (or other configuration value). The suggested data type can be indicated, in some implementations, using a specific symbol or lexical token or a particular keyword that can be recognized when the objects are to be instantiated (e.g., by the dynamic model and runtime generator component 572). As an example a request body may have the form:

```
{
    "Result": 5.45 :- "float"
}
```

Where the ":-" token indicates that "float" is a suggested data type for "Result." Or, a request body may have the form:

```
{
    "Result": pass SuggestedType = "string"
}
```

Where SuggestedType is an identifier indicating a suggested data type for "Result."

As explained, typical data services use models having predefined, static configuration values. The disclosed innovations can allow a property such as "Result," to be assigned a value having a configuration value that depends on a particular use scenario that is determined at runtime. In addition to potentially having different configuration values between requests (e.g., a first request being associated with a Boolean data type and a second request being associated with a string or character array), a single request can include a single property to be instantiated multiple times with different data configuration values. As in the example above, a request may include operations to set a "Result" property to multiple values, including a float value and a string value. Other types of configuration values could be assigned to "Result," including integers, Boolean values, abstract or composite data types, etc.

The request is sent to the database at 648. At 652 it is determined whether the data is in the correct format to be written (e.g., creating, updating, or deleting a record). If the data is in the correct format, the data can be written at 656. If the data is not in the correct format, the runtime objects can be flushed at 640, and object instances having the correct configuration values created at 644 based on the data type information received from the database. After the data is written at 656, execution results can be returned, such as to a client application, at 660. At optional step 658, the execution results can be encrypted before being returned at 660, such as by the dynamic configuration handler 552, In sending execution results to the client application, the results can pass through one or more components, including the data access layer 588, the data objects and interface 576, the dynamic configuration handler 552, and the central configuration 536.

Example 9—Example Read Request Processing Using Dynamic Data Service

Figure 7:
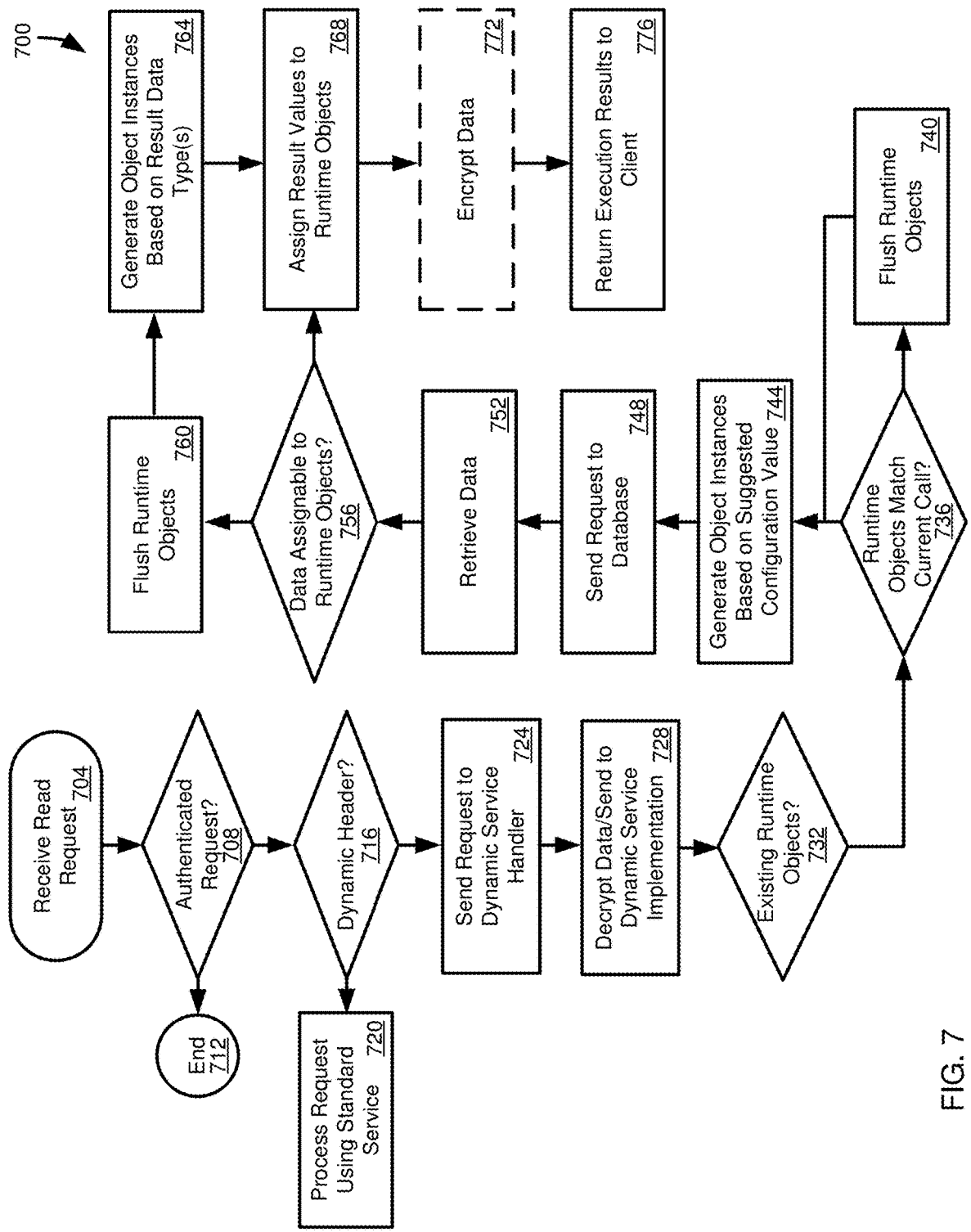
FIG. 7 is a flowchart of an example method for executing a read request from a client application using a dynamic data service according to an embodiment of the present disclosure.

FIG. 7 illustrates example operations 700 occurring during processing of a request to read data using a dynamic service according to a disclosed innovation. The operations 700 can be carried out, for example, using the components of the architecture 500.

At 704, a read request (e.g., a GET request using the HTTP protocol) is received. It is determined at 708 whether the request is authenticated. For instance, it can be determined whether an authorization token, such as a username and password, matches authorization criteria associated with the request (e.g., credentials maintained for a user). Although shown as occurring after 704, determination 708 can be made at a different time. For instance, the determination at 708 can be made prior to receiving the read request at 704, such as when a communication session is established between a client device or application and a computing platform operating a middleware component.

If the request is not authenticated, the operations 700 can terminate at 712, including sending an error message or notification to the client application. If the request is authorized, at 716, it is determined whether header information for the request indicates that a dynamic service should be used. In some cases, it is determined at 716 that a dynamic service is not indicated for use, and so the request is processed using a standard service (including a standard service of a type indicated in the request header, such a SOAP service or an OData service) at 720. If it is determined at 716 that a dynamic service should be used to process the request, the request can be sent to a dynamic service handler at 724. In some cases, such as when only a dynamic service is provided, 716 can be omitted, and the operations 700 can proceed from 708 to 724.

At 728, data associated with the request is decrypted (if encrypted in the request) and sent to a dynamic service implementation. In some aspects, 728 can be omitted. The dynamic service implementation determines an appropriate model template to be used with the request and the appropriate runtime generator for use with the model template. It is determined at 732 whether existing runtime objects exist for the model template. If runtime objects exist for the model template, it is determined at 736 whether the runtime objects match, or are suitable for use with, the current request.

If the runtime objects are not suitable for use with the current request (such as having the correct configuration values), the runtime objects can be flushed at 740 (e.g., by calling the destructor component 580 of FIG. 5). If the runtime objects were determined not to exist at 732, or were determined not to have the correct configuration values at 736, or after existing objects are flushed at 740, the operations proceed to 744. At 744, objects (e.g., instances of entities and properties) are generated based on a suggested configuration value. The suggested configuration value can be a default configuration value, such as a default configuration value specified in the dynamic model template. In another implementation, the configuration value can be determined after execution results are received from a database.

A request to read the requested data is sent to the data store at 748. The data store, such as a database, retrieves the data at 752. At 756 it is determined whether the retrieved data is assignable to the runtime objects. If the data is not assignable to one or more runtime objects, such as because the objects do not have the correct configuration values to be assigned the retrieved data, the one or more runtime objects (or, in some cases, all runtime objects) can be flushed at 760, which can be analogous to 740. The correct runtime objects can be generated at 764, which can be analogous to 744. If the runtime objects were determined at 756 to have the correct configuration values, or runtime objects having the correct configuration values are generated at 764, the retrieved data is assigned to the runtime objects at 768. At optional step 772 the retrieved data can be encrypted, and the retrieved data returned to the client at 776.

Example 10—Example Client Application Screens Enabled by Dynamic Data Service

FIGS. 8A-8C illustrate example screens 800, 840, 860 that illustrate how disclosed innovations can provide enhanced flexibility in creating applications that interact with a database. The screen 800 illustrates various fields

804, at least a portion of which may have values or content that are populated using data from a database system. Fields 804 that are associated with database data can be associated with a data type. Although data type is shown, other types of attributes and their configuration values can be handled in an analogous manner.

The screen 800 illustrates a number of fields 804, including a field 804a for "Description," a field 804b for "Acceptable Range," a field 804c for "Number of Inputs," and a field 804d for "Result." Taking the field 804d for "Result," this can represent a field where a user may input values to be stored in a database, or which can be populated based on values stored in the database. As shown, values for the field 804d have not yet been provided.

In some cases, different rows or records 808 of the screen 800 can have different input types. For instance, record 808a can represent a text-entry field where a user can input a value to be stored for the record. Record 808c can represent a field having a dropdown menu from which a user may select a value for the "Result" field 804d of the record. Record 808b can represent a field where, upon selecting the field, or a user interface component associated with the field, the screen 840 is displayed.

The screen 840 can provide a plurality of text entry fields 842, and a user may enter values in one or more of the fields. A user can choose to save or apply the entered values by selecting a "save" element 844. After selecting the "save" element, the screen 860 can be displayed.

The screen 860 illustrates the results of values being entered or selected for the "Result" field 804d of the records, 808a, 808b, 808c. The values in the "Results" field all have different data types. The "Result" field 804d of record 808a can be an integer, the field of record 808c can be a string (or could be mapped to a Boolean data type), and the field of record 808b can be a float (calculated from the average of values entered in the fields 842 of the screen 840). In some case, the calculated average, and the individual values entered in screen 840, can be sent to be stored in a database. In other cases, only the average, or the individual values, are sent.

The "Result" field 804d may correspond to a particular entity of a particular data model template used by a data service used to interface with a database to store values entered in a screen 800, 840, 860, or retrieve values to be displayed (or otherwise used in association with) a screen. Even though a single entity may be used, the "Result" field 804d, even on a single screen (e.g., screen 860), can have a plurality of data types, which can be passed to a data service in a single session (e.g., a series of temporally proximate interactions between a client and a data service, including based on a common authentication event). Such functionality is not provided by typical data services, particularly when a single model, or a single entity of a single model, is used to serialize and transfer data between a client application and a database.

In typical data services, the "Result" field 804d would be limited to a single data type, or multiple entities, models, or data services would be needed to provide multiple data types for the "Result" field. However, including multiple models, entities, or data services can increase development time and complexity, and can impact performance, including because more metadata may be sent from the data service to the client application, or because multiple requests may be needed to obtain data rather than a single request that can be used with disclosed innovations. Moreover, even if multiple models or entities were used, that collection of models/entities would still be static-if new data types were needed, yet more models or entities would have to be created in the service before a client application could use them.

Example 11—Example Data Model and Data Model Template Configuration

Figure 9A:
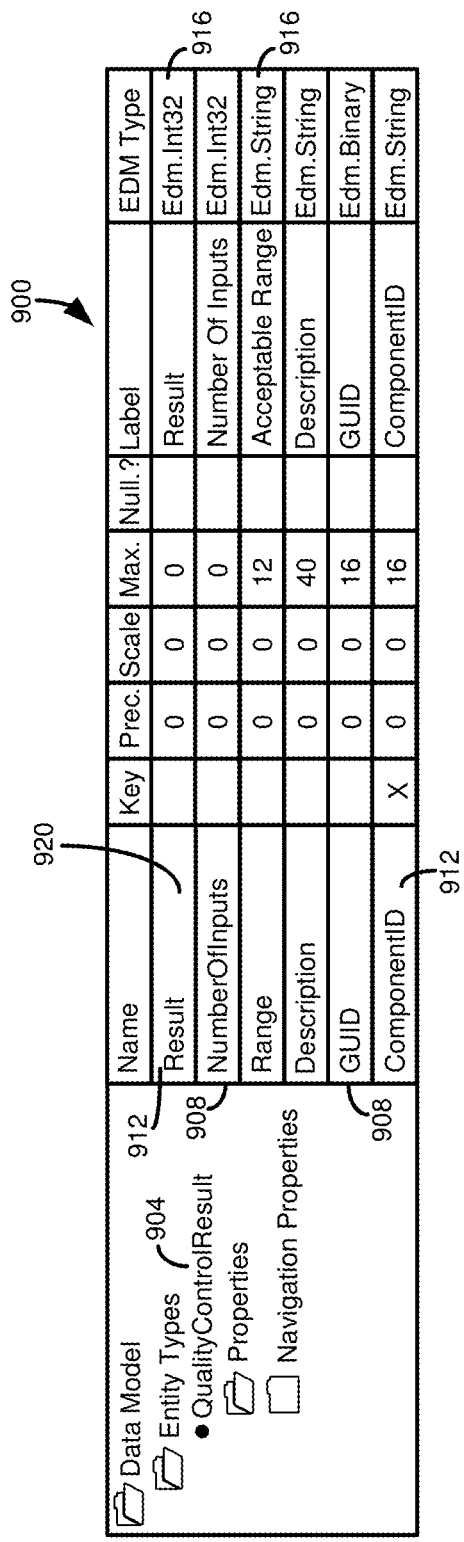
FIGS. 9A and 9B are, respectively, example configuration screens illustrating a data model for a static data service and a data model template for a dynamic data service according to an embodiment of the present disclosure.

FIG. 9A illustrates a portion of an example data model 900 for a typical data service (e.g., an OData service using a static model). The data model 900 includes data for a particular entity type 904 ("QualityControlResult"). The data includes a plurality of properties 908, each having a plurality of parameters (or attributes), include a name 912 and a type 916 (a data type, "EDM Type"). Of note, each property 908 is limited to a single data type 916. In this case, the "Result" property 920 is limited to an integer. Thus, thus entity 904 would not be able to produce the values in the screen 860, as it would not be designed to display results having data types of floats, strings, Boolean values, etc.—anything other than integers.

Figure 9B:
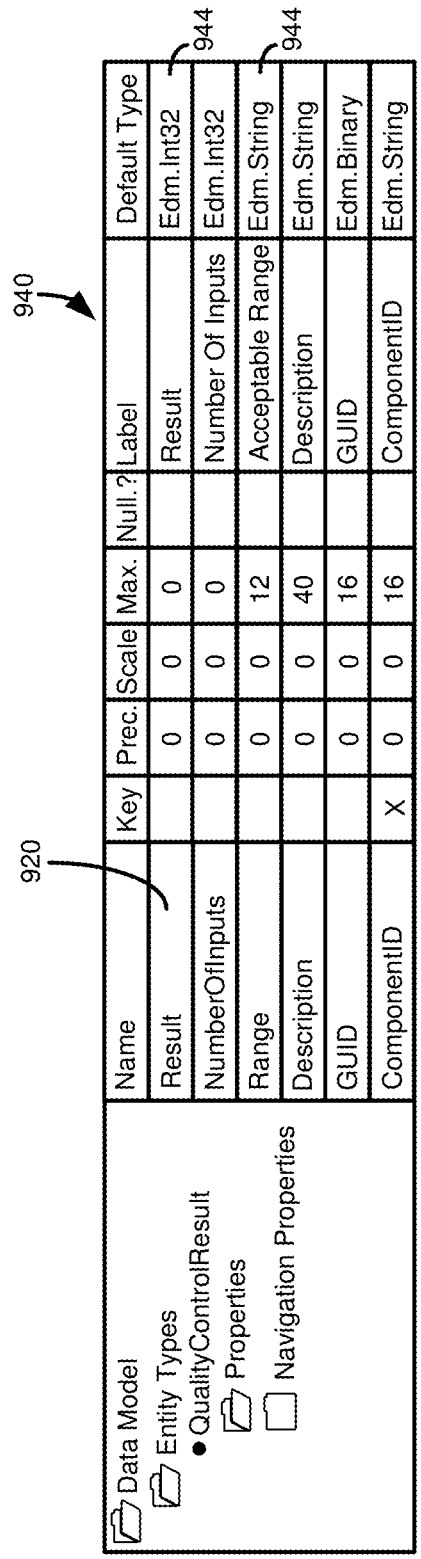

FIG. 9B illustrates an example data model template 940 according to a disclosed innovation. The data model template 940 can be at least generally similar to the data model 900. However, rather than having a type 916, the data model template 940 includes a default type 944. The default type 944 can be used to generate a data model from the data model template. For instance, the data model 900 can be generated from the data model template 940 by supplying the data model template with the data types 916.

However, unlike the data model 900, the data model template 940 can instantiate the properties 908 in data types other than the default data type. For example, if a request from a database client specifies a type other than the default data type, the properties 908 are instantiated (including in a data model and objects instantiated based on the data model) using the data type specified in the request. Or, the data types can be specified by data types of execution results received by a service implementing disclosed innovations from a database. In at least some cases, the data model template 940 can omit the default types 944.

Although not shown, when a data model template 940 is used to instantiate objects, it can also be used to instantiate methods associated with the objects (e.g., actions that can be performed on or with an entity), and can be used to provide access to the objects and methods. Taking the data model template 940 to be analogous to the data model 400 of FIG. 4, particular methods 430 may be instantiated based on the data model template 940, or the implementation of a method can be adapted based on particular configuration values associated with the data model template (including configuration values provided in a request or associated with data in a database that is associated with the data model template). For instance, the data model template 940 can be used to generate a URI, such as a URL or URN, that can be used to access an object or its methods. As an example, for the QualityControlResult entity shown in FIG. 9B, the data model template can be used to generate a URL where the entity can be accessed, such as: https://servername:port_number/internal_icf_nodes/odata/sap/Z_PROJECT_NODE/QualityControlResult. Like objects, methods and URIs can be removed, such as when the data model template 940 is to be used to instantiate objects or methods having one or more data types that are different than currently instantiated objects or methods.

The data model template 940 can establish associations with other data model templates and other data models (e.g., a model 400), including data models associated with static data services. For instance, a data model template 940 can inherit all or a portion of a data model template or data model, including selected properties and methods. Such associations can reduce development effort in creating new data model templates, and can provide a mechanism for modifying data models associated with static services. That is, for a dynamic service, rather than rewriting an entire data model as a data model template, the data model template can inherit a selected portion of a data model and can add additional properties, attributes, methods, etc., or change configuration values, including modifying or replacing properties, attributes, methods, etc. of the data model. These associations can also be useful when it would be undesirable to modify an existing data model or data model template because of dependencies between the existing data model or data model templates and underlying data or other data models or data model templates.

The data model template 940 can provide various advantages. As the data model template 940 is not a model, in some cases, its metadata may not be sent to a client application which utilizes a dynamic service according to disclosed innovations. In other cases, the amount of metadata sent can be reduced compared with static data services, including by sending a complete copy of the metadata to the client upon initial connection and thereafter, on subsequent connections, only sending updates or changes to the metadata. Accordingly, the client application can be faster and more responsive. Because the data model template 940 is flexible, multiple configuration values for an attribute of a property of an entity can be sent by a client application to a single data service, and in some cases in a single request, to be processed using the data model template 940. Multiple requests to multiple service types or implementations (e.g., multiple different entity models) are not needed, which can reduce design time and complexity, and can reduce the number of requests and responses between both the client application and the service and between the service and the database to carry out particular functions. The reduced number of requests can improve response time, as well as reducing network use, processor use, and memory use.

Figure 10:
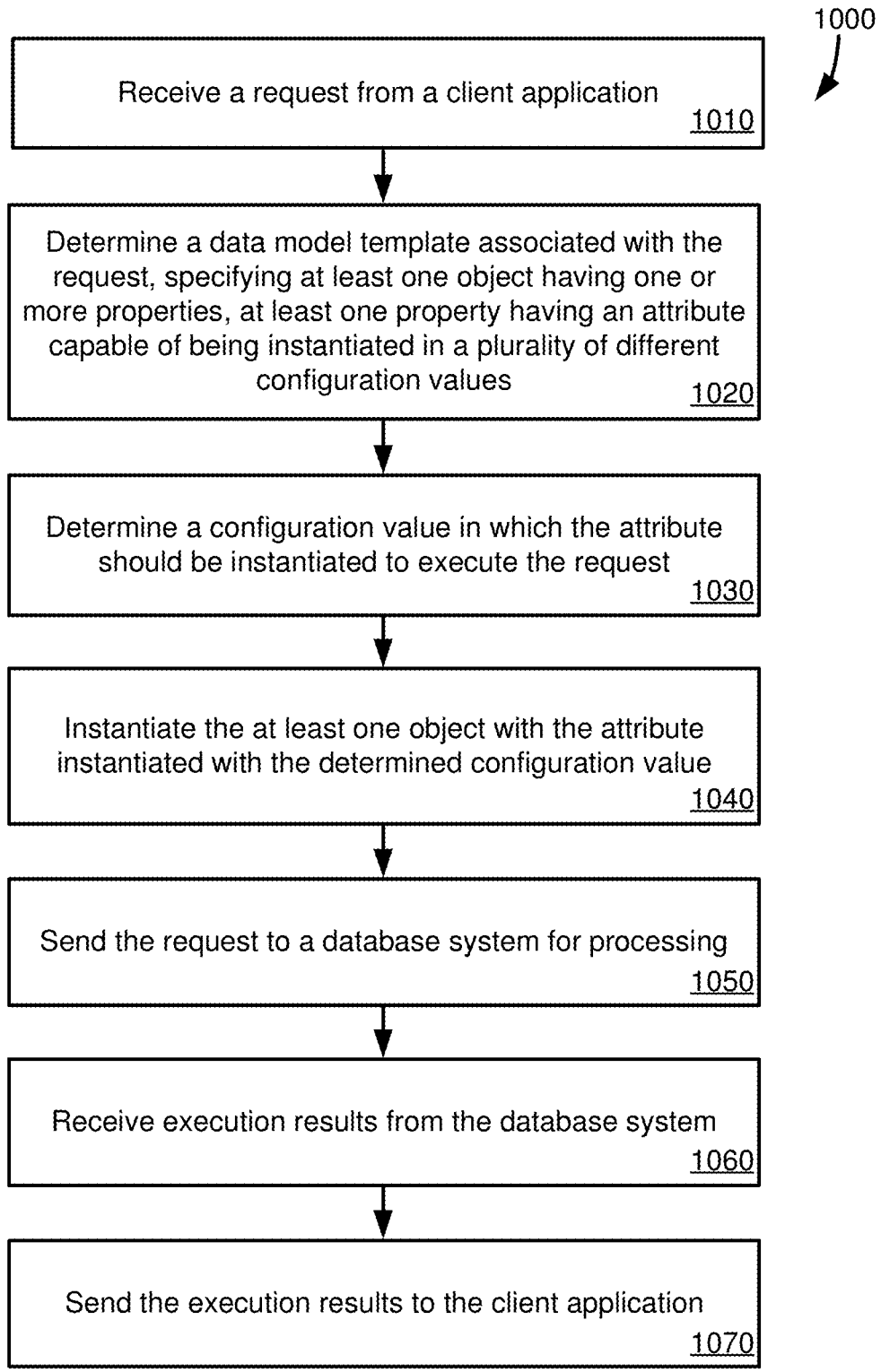
FIG. 10 is a flowchart of an example method of servicing a client request for database operations using a dynamic data service according to an embodiment of the present disclosure.

Example 12—Example Method of Processing Client Request for Database Operations Using Dynamic Data Service FIG. 10 illustrates a method 1000 for processing a request for data store services, such as using a dynamic service according to a disclosed innovation. The method 1000 can be carried out, for example, using the architecture 500 of FIG. 5. Specifically, the method can be carried at least in part using the dynamic header implementation 570 and dynamic model and runtime generator 572.

At 1010, a request is received from a client application to access data stored in a database system. The database system is located remotely to a computer system on which the client application is executing. In other cases, the database system is not located remotely to the computer system on which the client application is executing.

The request can be, for example, to read data of the database system or to write (e.g., create, update, or delete database records) data at the database system. A data model template associated with the request is determined at 1020. The data model template 1020 specifies at least one object comprising one or more properties. The properties, can be data members of the object. The object can represent a class or similar abstract data type. At least one of the one or more properties has at least a first attribute capable of being instantiated in a plurality of different configuration values.

At 1030, a configuration value is determined in which the at least a first attribute should be instantiated to execute the request (e.g. a suitable data type such that a data member instantiated in the data type can be assigned a value specified in the request, or assigned a value specified by execution results of executing the request at the database). The configuration value can be determined, in some cases, from the request. For instance, the data type can be specified in the request, including using a lexical token indicating that the data type is a specified or suggested data type to be used to instantiate a data member to be assigned a value for the data member included in the request. In other cases, the configuration value can be a default configuration value, which can be specified in the data model template, and can be used to instantiate a data member having the at least a first attribute with the default configuration value, such as a default data type for receiving execution results from the database. In yet further cases, the configuration value can be specified based on execution results received from the database. The at least one object is instantiated at 1040 with the at least one of the one or more properties instantiated in the determined configuration value.

At 1050, the request is sent to the database system for execution. In at least some cases, the request can be translated, reformatted, encoded, decoded, encrypted, decrypted, or otherwise modified before being sent to the database. Execution results are received from the database system at 1060. At 1070, the execution results are sent to the client application. In at least some cases, the execution results can be translated, reformatted, encoded, decoded, encrypted, decrypted, or otherwise modified before being sent to the client application.

FIG. 11 illustrates a method 1100 for processing a request for data store services, such as using a dynamic service according to a disclosed innovation. The method 1100 can be carried out at least in part, for example, using the architecture 500 of FIG. 5. Specifically, the method can be carried at least in part using the dynamic header implementation 570 and dynamic model and runtime generator 572.

At 1110, a request is received from a client application. The request includes one or more operations to be carried out at a database. The one or more operations are associated with at least one value having a data type. A data model is generated, at 1120, from a data model template based at least in part on the data type of the at least one value. The value is associated with a data member of the data model template, where the data member can be instantiated in a plurality of data types. The generated data model has the data member instantiated in the data type.

At 1130, a request is sent to a database to execute the one or more operations. Execution results are received from the database at 1140 and sent to the client application at 1150. At least one of sending a request to the database and receiving execution results from the database includes assigning a value in the data type to the data member.

Example 13—Example Client Operations with Dynamic Data Service

FIG. 12 illustrates a method 1200 for making a request to a dynamic service according to a disclosed innovation. The method 1200 can be carried out, for example, using the architecture 500 of FIG. 5. Specifically, the method can be carried out at least in part using the client application 508 and the data access layer 512. The request can be processed, at least in part, by the dynamic header implementation 570 and the dynamic model and runtime generator 572.

At 1210, one or more requests to access data at a database system are generated. The database system is in communication with a data service. The data service is also in communication with the client device. The one or more requests are associated with at least a first attribute of at least one property of a data model template and the accessed data (which may be data to be read from, or data to be written to, the database) is associated with at least first and configuration values of the at least a first attribute. The one or more requests are sent to the data service at 1220. At 1230, one or more communications are received from the data service. The one or more communications include execution results associated with the first and second configuration values.

Example 14—Example Computing Systems

Figure 13:
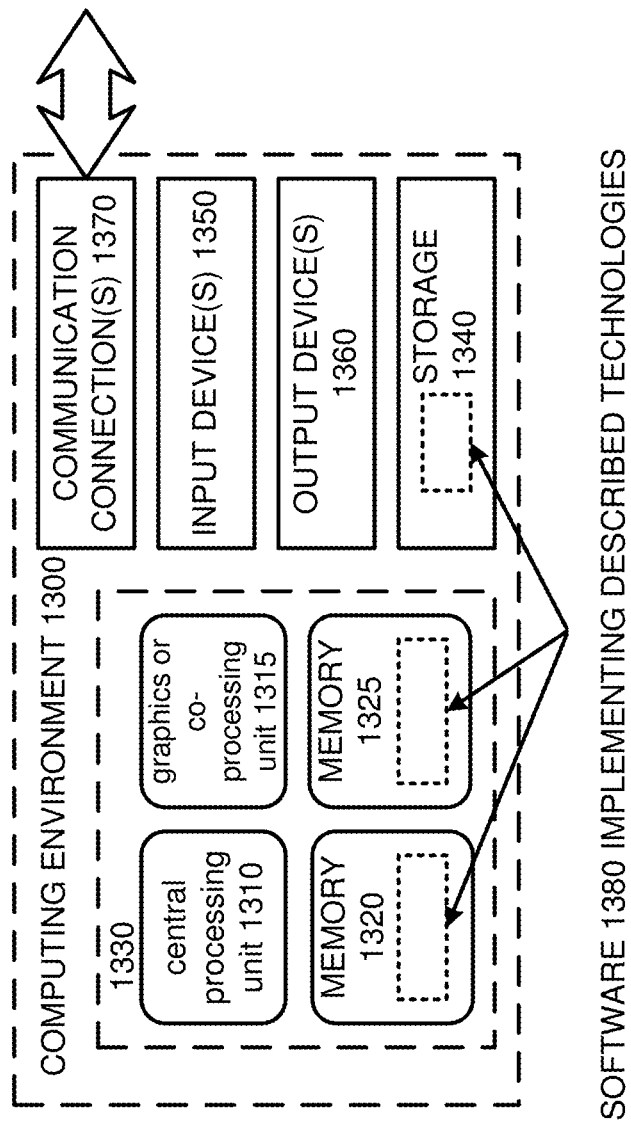
FIG. 13 is a diagram of an example computing system in which described embodiments can be implemented.

FIG. 13 illustrates a generalized example of a suitable computing system 1300 in which several of the described innovations may be implemented. The computing system 1300 is not intended to suggest any limitation as to scope of use or functionality, as the innovations may be implemented in diverse general-purpose or special-purpose computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s). The memory 1320, 1325 stores software 1380 implementing one or more innovations described herein, in the form of computer-executable instructions suitable for execution by the processing unit(s), such instructions for implementing a dynamic data service.

A computing system may have additional features. For example, the computing system 1300 includes storage 1340, one or more input devices 1350, one or more output devices 1360, and one or more communication connections 1370. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information in a non-transitory way and which can be accessed within the computing system 1300. The storage 1340 stores instructions for the software 1380 implementing one or more innovations described herein. The storage 1340 does not include signals per se.

The input device(s) 1350 may be a touch input device such as a keyboard, mouse, pen, or trackball, a voice input device, a scanning device, or another device that provides input to the computing system 1300. For video encoding, the input device(s) 1350 may be a camera, video card, TV tuner card, or similar device that accepts video input in analog or digital form, or a CD-ROM or CD-RW that reads video samples into the computing system 1300. The output device(s) 1360 may be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 15—Example Cloud-Supported Environment

Figure 14:
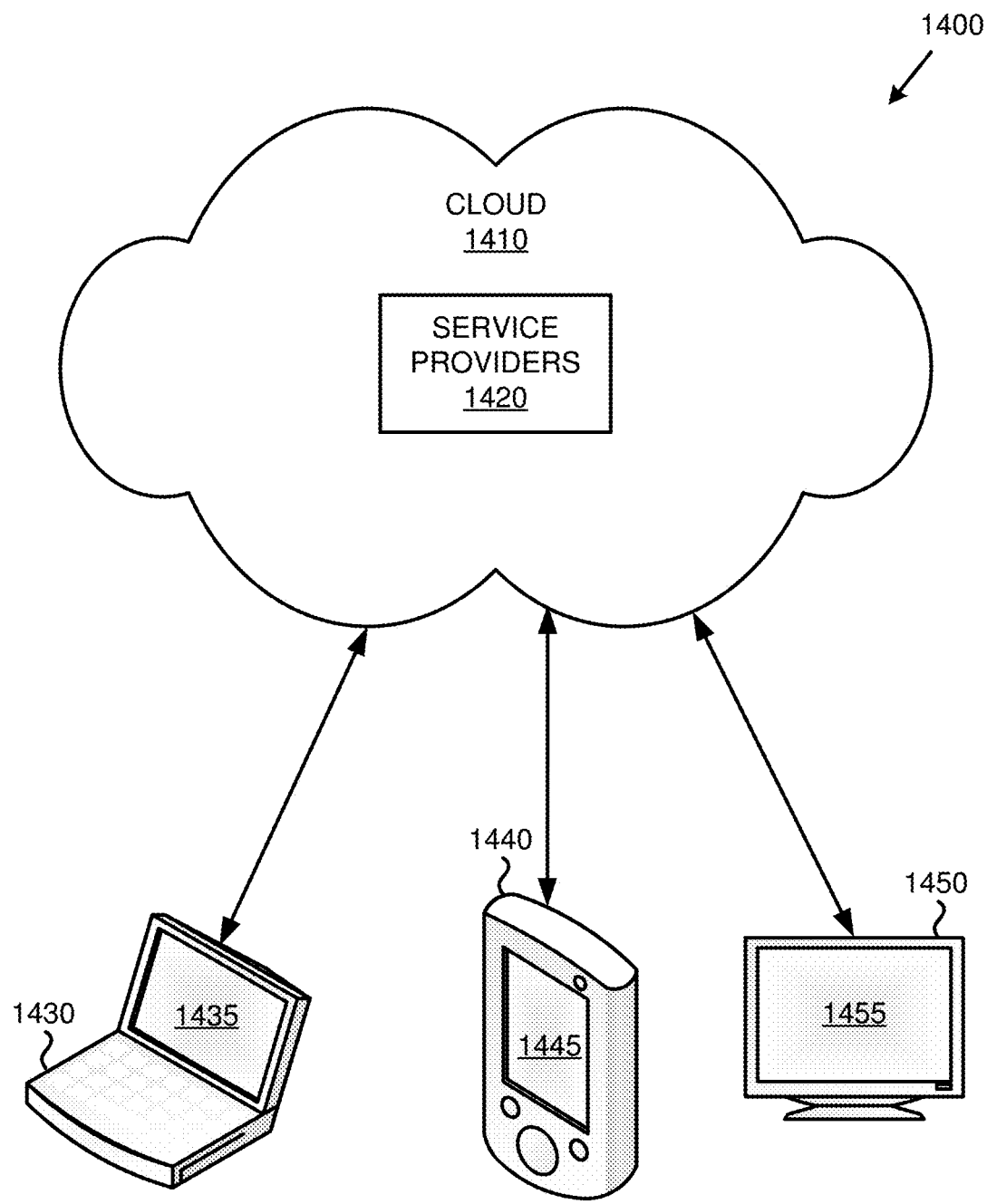
FIG. 14 is an example cloud-support environment that can be used in conjunction with the technologies described herein.

In example environment 1400 of FIG. 14, the cloud 1410 provides services for connected devices 1430, 1440, 1450 with a variety of screen capabilities. Connected device 1430 represents a device with a computer screen 1435 (e.g., a mid-size screen). For example, connected device 1430 could be a personal computer such as desktop computer, laptop, notebook, netbook, or the like. The connected device 1440 represents a device with a mobile device screen 1445 (e.g., a small size screen). For example, the connected device 1440 could be a mobile phone, smart phone, personal digital assistant, tablet computer, and the like. The connected device 1450 represents a device with a large screen 1455. For example, the connected device 1450 could be a television screen (e.g., a smart television) or another device connected to a television (e.g., a set-top box or gaming console) or the like. One or more of the connected devices 1430, 1440, 1450 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1400. For example, the cloud 1410 can provide services for one or more computers (e.g., server computers) without displays.

Services can be provided by the cloud 1410 through service providers 1420, or through other providers of online services (not depicted). For example, cloud services can be customized to the screen size, display capability, and/or touch screen capability of a particular connected device (e.g., connected devices 1430, 1440, 1450).

In example environment 1400, the cloud 1410 provides the technologies and solutions described herein to the various connected devices 1430, 1440, 1450 using, at least in part, the service providers 1420. For example, the service providers 1420 can provide a centralized solution for various cloud-based services. The service providers 1420 can manage service subscriptions for users and/or devices (e.g., for the connected devices 1430, 1440, 1450 and/or their respective users).

Example 16—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media).

Any of the computer-readable media herein can be non-transitory (e.g., volatile memory such as DRAM or SRAM, nonvolatile memory such as magnetic storage, optical storage, or the like) and/or tangible. By way of example, and with reference to FIG. 13, computer-readable storage media include memory 1320 and 1325, and storage 1340. The term computer-readable storage media does not include signals and carrier waves. In addition, the term computer-readable storage media does not include communication connections (e.g., 1370). Computer-readable media can be limited to implementations not consisting of a signal. None of the computer-readable media herein include signals per se.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Example 17—Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. All that comes within the scope and spirit of the claims is therefore claimed as the invention.

What is claimed is:

1. A computer system comprising:
   memory;
   one or more hardware processors coupled to the memory; and
   one or more computer-readable media storing computer-executable instructions that, when executed by the computer system, cause the computer system to perform operations comprising:
      receiving a request from a client application to access data stored in a database system, the database system being located remotely to a computing device on which the client application is executing;

from a stored plurality of data model templates, determining a data model template associated with the request, the data model template having a configuration value and specifying at least one object comprising one or more properties, at least one property of the one or more properties having at least a first attribute, the configuration value specifying a default data type for the at least a first attribute;

based at least in part on information included in the request, determining a first data type in which the at least one property should be instantiated to execute the request;

instantiating the at least one object as a first instantiated object with the at least one property instantiated with the determined first data type;

sending the request to the database system for execution;

receiving execution results for the request from the database system, the execution results comprising a value having a second data type;

determining that the second data type is not compatible with the first data type;

instantiating, based at least in part on the determining, the at least one object as second instantiated object with the at least one property instantiated with the second data type;

assigning the value to the at least one property of the second instantiated object; and sending the execution results to the client application in a third data type, wherein the third data type can be the same as the first data type or the second data type.

2. The system of claim 1, wherein the first data type is specified in the request.

3. The system of claim 2, wherein the first data type specified in the request is different than the default data type.

4. The system of claim 2, wherein the first data type is specified in a body of a protocol request.

5. The system of claim 1, the operations further comprising:
from the request, determining that the request is to be processed by a dynamic service, wherein the determining a data model template, the determining a first data type, and the instantiating the at least one object are carried out by one or more components of the dynamic service.

6. The system of claim 5, wherein the request is a first request and the client application is a first client application, the operations further comprising:
receiving a second request from a second client application, which can be the first client application, to access data stored in the database system;
from the second request, determining that the second request is to be processed by a static service associated with a data model having fixed data types for model objects; and
sending the second request to the static service for processing.

7. The system of claim 1, the operations further comprising:
determining that one or more objects were previously instantiated for the data model template; and
destroying the one or more previously instantiated objects.

8. The system of claim 1, wherein a description of a data model associated with the data model template is not provided to the client application to use for generating the request.

9. The system of claim 1, the operations further comprising:
creating a data model from the data model template, the data model specifying the determined first data type for at least a first attribute.

10. The system of claim 1, wherein the request specifies a plurality of data types for at least a first attribute, at least some of the data types being different from first data type.

11. The system of claim 1, wherein the request specifies a plurality of values to be retrieved from the database system, each value of the plurality of values associated with a data type, at least some of the data types being different from the first data type.

12. The system of claim 1, the operations further comprising:
generating at least one interface method for the request based on the determined first data type.

13. A method implemented at least in part by a computer system implementing a data service, the method comprising, in association with a single session with a data service client:
receiving, by the computer system from the data service client, a first request to access data at a database system, the database system in communication with the data service, the data service further in communication with the data service client, the first request associated with at least a first attribute of at least one property of a data model template and the accessed data associated with a first data type of the at least one property, the data model template having the at least a first attribute assigned a configuration value;
sending, by the computer system, the first request to the database system;
receiving, by the computer system, a first response for the first request from the database system, the first response comprising first execution results in the first data type;
receiving, by the computer system from the data service client, a second request to access data at the database system, the second request associated with the at least a first attribute and associated with a second data type of the at least a first attribute;
determining, by the computer system, that the second data type is not compatible with the first data type by comparing the second data type with the first data type;
instantiating using the data model template, by the computer system, an instantiated data object having the at least one property instantiated with the second data type based at least in part on the determining;
sending, by the computer system, the second request to the database system;
receiving, by the computer system, a second response for the second request from the database system, the second response comprising second execution results in the second data type, the second data type being different than the first data type;
assigning, by the computer system, a value of the second execution results to the at least one property of the instantiated data object; and
sending, by the computer system, the second execution results in the second data type to the data service client.

14. The method of claim 13, further comprising:
from the second request, determining that the second request is to be processed by a dynamic service, wherein the comparing the second data type, the determining that the second data type is not compatible with the first data type, and the instantiating the instantiated data object are carried out by one or more components of the dynamic service.

15. The method of claim 14, further comprising:
receiving a third request for access to data stored in the database system;
from the third request, determining that the third request is to be processed by a static service associated with a data model having fixed data types for model objects; and
sending the third request to the static service for processing.

16. The method of claim 13, wherein a description of a data model associated with the data model template is not provided to the data service client to use for generating the first request or the second request.

17. A system comprising:
memory;
one or more hardware processors coupled to the memory; and
one or more computer-readable media storing instructions that, when loaded into the memory, cause the one or more hardware processors to perform operations for, by a data service in association with a single session with a data service client:
receiving from a data service client, a first request to access data at a database system, the database system in communication with the data service, the data service further in communication with the data service client, the first request associated with at least a first attribute of at least one property of a data model template and the accessed data associated with a first data type of the at least one property, the data model template having the at least a first attribute assigned a configuration value;
sending, by the computer system, the first request to the database system;
receiving, by the computer system, a first response for the first request from the database system, the first response comprising first execution results in the first data type;
receiving, by the computer system from the data service client, a second request to access data at the database system, the second request associated with the at least a first attribute and associated with a second data type of the at least a first attribute;
determining, by the computer system, that the second data type is not compatible with the first data type by comparing the second data type with the first data type;
instantiating using the data model template based at least in part on the determining, by the computer system, an instantiated data object having the at least one property instantiated with the second data type;
sending, by the computer system, the second request to the database system;
receiving, by the computer system, a second response for the second request from the database system, the second response comprising second execution results in the second data type, the second data type being different than the first data type;
assigning, by the computer system, a value of the second execution results to the at least one property of the instantiated data object; and
sending, by the computer system, the second execution results in the second data type to the data service client.

18. The system of claim 17, the operations further comprising:
from the second request, determining that the second request is to be processed by a dynamic service, wherein the comparing the second data type, the determining that the second data type is not compatible with the first data type, and the instantiating the instantiated data object are carried out by one or more components of the dynamic service.

19. The system of claim 17, the operations further comprising:
receiving a third request for access to data stored in the database system;
from the third request, determining that the third request is to be processed by a static service associated with a data model having fixed data types for model objects; and
sending the third request to the static service for processing.

20. The system of claim 17, wherein a description of a data model associated with the data model template is not provided to the data service client to use for generating the first request or the second request.

* * * * *